US011700296B2

(12) United States Patent
Dippenaar et al.

(10) Patent No.: US 11,700,296 B2
(45) Date of Patent: Jul. 11, 2023

(54) CLIENT-DIRECTED PLACEMENT OF REMOTELY-CONFIGURED SERVICE INSTANCES

(71) Applicant: Amazon Technologies, Inc., Seattle, WA (US)

(72) Inventors: Andries Petrus Johannes Dippenaar, Western Cape (ZA); Duncan Matthew Clough, Western Cape (ZA); Gideon Jan-Wessel Redelinghuys, Western Cape (ZA); Mathew Daniel, Gauteng (ZA); Gideon Klompje, Western Cape (ZA); Gavin Alexander Bramhill, Western Cape (ZA); Marcin Piotr Kowalski, Western Cape (ZA); Richard Alan Hamman, Western Cape (ZA); Roland Paterson-Jones, Western Cape (ZA); Almero Gouws, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 537 days.

(21) Appl. No.: 16/446,212

(22) Filed: Jun. 19, 2019

(65) Prior Publication Data
US 2019/0306026 A1 Oct. 3, 2019

Related U.S. Application Data

(63) Continuation of application No. 14/133,533, filed on Dec. 18, 2013, now Pat. No. 10,333,789.

(51) Int. Cl.
*H04L 67/025* (2022.01)
*H04L 41/0893* (2022.01)
(Continued)

(52) U.S. Cl.
CPC ........ *H04L 67/025* (2013.01); *H04L 41/0893* (2013.01); *H04L 63/00* (2013.01); *H04L 67/52* (2022.05); *H04L 41/5041* (2013.01)

(58) Field of Classification Search
CPC . G06Q 30/06; H04L 41/0893; H04L 41/5041; H04L 41/5054; H04L 63/00;
(Continued)

(56) References Cited

U.S. PATENT DOCUMENTS 7,724,513 B2 5/2010 Coglitore et al.
8,122,282 B2 2/2012 Betzler et al.
(Continued)

OTHER PUBLICATIONS

U.S. Appl. No. 13/747,176, filed Jan. 22, 2013, Marcin Piotr Kowalski.
(Continued)

*Primary Examiner* — Clayton R Williams
(74) *Attorney, Agent, or Firm* — Robert C. Kowert; Kowert, Hood, Munyon, Rankin & Goetzel, P.C.

(57) ABSTRACT

Methods and apparatus for client-directed placement of remotely configured service instances are described. One or more placement target options are selected for a client of a network-accessible service based on criteria such as service characteristics of the placement targets. The selected options, including a particular placement target that includes instance hosts configurable from remote control servers, are indicated programmatically to the client. A determination is made that a service instance is to be configured at the particular placement target on behalf of the client. A remote control server is configured to issue administrative commands to an instance host at the particular placement target to configure the service instance.

20 Claims, 11 Drawing Sheets

(51) Int. Cl.
*H04L 9/40* (2022.01)
*H04L 67/52* (2022.01)
*H04L 41/5041* (2022.01)

(58) Field of Classification Search
CPC ....... H04L 67/18; H04L 67/025; H04L 67/34; H04L 41/0813
See application file for complete search history.

(56) References Cited

U.S. PATENT DOCUMENTS

| | | |
|---|---|---|
| 8,218,322 B2 | 7/2012 | Clidaras et al. |
| 8,250,215 B2 | 8/2012 | Stienhans et al. |
| 8,261,295 B1 | 9/2012 | Risbood et al. |
| 8,271,536 B2 | 9/2012 | Amradkar et al. |
| 8,271,653 B2 | 9/2012 | Dehaan |
| 8,310,829 B2 | 11/2012 | Monk et al. |
| 8,819,202 B1* | 8/2014 | Carolan ............. H04L 41/5054 709/223 |
| 9,059,933 B2 | 6/2015 | Doerr et al. |
| 10,333,789 B1 | 6/2019 | Dippenaar et al. |
| 2003/0144894 A1* | 7/2003 | Robertson ............. G06Q 20/00 709/226 |
| 2008/0219268 A1 | 9/2008 | Dennison |
| 2010/0064033 A1 | 3/2010 | Travostino et al. |
| 2011/0022711 A1* | 1/2011 | Cohn ...................... H04L 41/04 709/225 |
| 2011/0055399 A1 | 3/2011 | Tung et al. |
| 2011/0126207 A1 | 5/2011 | Wipfel et al. |
| 2011/0219372 A1* | 9/2011 | Agrawal ................. H04L 67/06 718/1 |
| 2011/0231525 A1 | 9/2011 | Balani et al. |
| 2012/0054624 A1 | 3/2012 | Owens, Jr. et al. |
| 2012/0072597 A1 | 3/2012 | Teather et al. |
| 2012/0124211 A1 | 5/2012 | Kampas et al. |
| 2012/0226789 A1 | 9/2012 | Ganesan et al. |
| 2012/0239739 A1 | 9/2012 | Manglik et al. |
| 2012/0330804 A1 | 12/2012 | Morrill et al. |
| 2013/0083476 A1 | 4/2013 | Clidaras et al. |
| 2013/0121207 A1 | 5/2013 | Parker |
| 2013/0231038 A1 | 9/2013 | Chang |
| 2013/0263120 A1 | 10/2013 | Patil et al. |
| 2014/0149492 A1 | 5/2014 | Ananthanarayanan et al. |
| 2015/0304240 A1 | 10/2015 | Mandaleeka et al. |

OTHER PUBLICATIONS

U.S. Appl. No. 13/747,190, filed Jan. 22, 2013, Marcin Piotr Kowalski.

U.S. Appl. No. 14/060,511, filed Oct. 22, 2013, Duncan Matthew Clough.

* cited by examiner

CLIENT-DIRECTED PLACEMENT OF REMOTELY-CONFIGURED SERVICE INSTANCES

This application is a continuation of U.S. patent application Ser. No. 14/133,533, filed Dec. 18, 2013, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Clients of virtualization-based computing services may implement various types of network-accessible applications, including for example content distribution applications, e-commerce applications and the like, using hosts and other resources typically located at large data centers maintained by the providers of the computing services. End users (e.g., customers of the service clients) may access the applications from network endpoints distributed throughout the world, often from locations that are geographically (or at least in terms of network hops) quite distant from the provider data centers. As a result, it may not always be straightforward to support the desired latencies for various types of end user requests.

Figure 1:
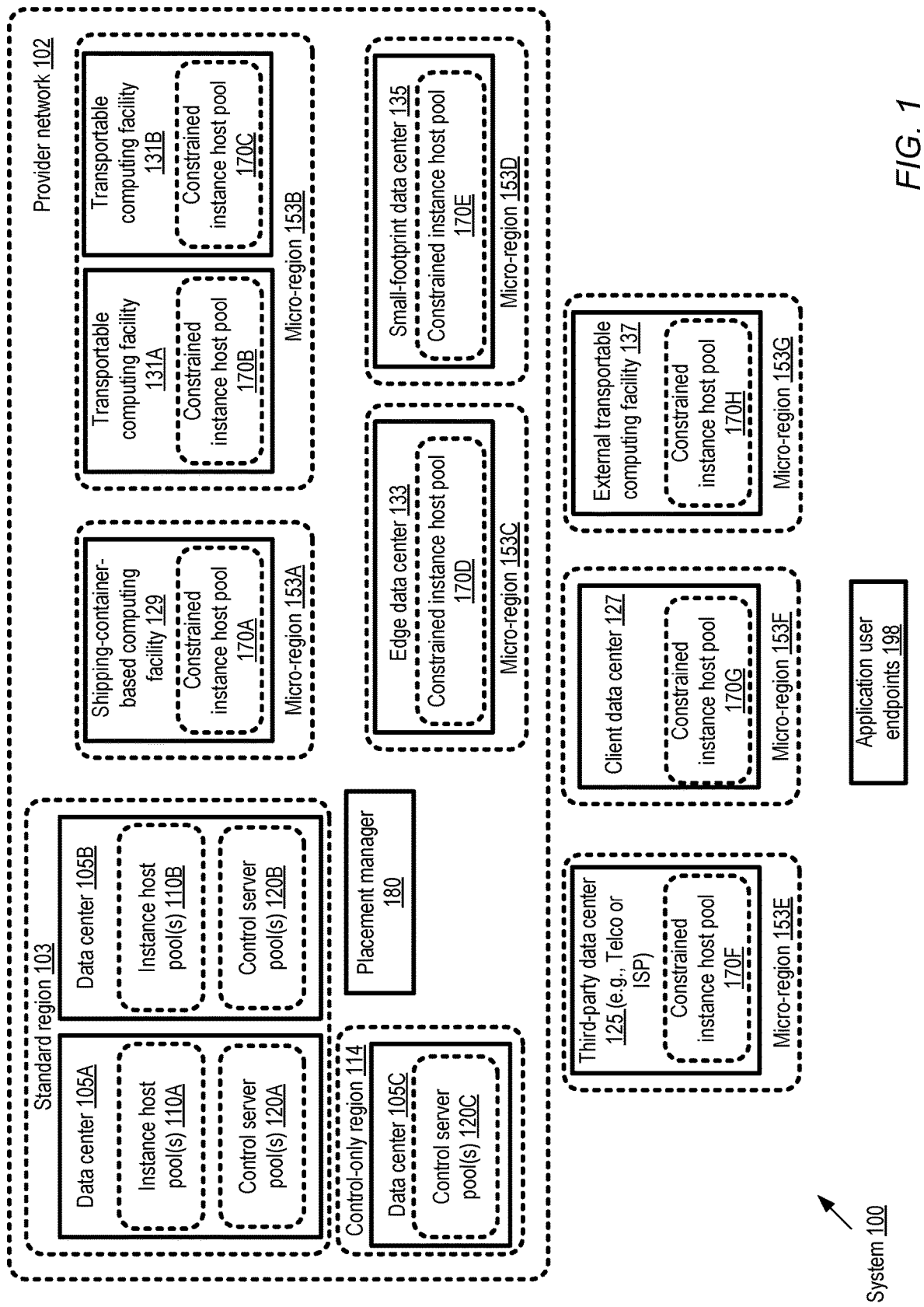
FIG. 1 illustrates an example system environment in which instance hosts located at a variety of placement targets may be configured using control servers of a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for client-directed placement of remotely-configured service instances are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. The term "multi-tenant" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. A provider network may support single-tenant services (such as for private cloud implementations) in some embodiments, either in addition to, or instead of, multi-tenant services. A given provider network may typically include several large data centers hosting various resource pools, such as collections of physical and/or virtualized computer servers, storage devices, networking equipment and the like, needed to implement, configure and distribute the infrastructure and services offered by the provider.

Generally speaking, the operations performed to implement a network-accessible service may be categorized into two groups: control-plane (administrative) operations, and data-plane (non-administrative) operations. For example, actions taken to start, configure, and stop service instances (such as virtual machines or "compute instances" in the case of a virtual computing service) may be considered control-plane operations, while actions taken at such service instances in response to application-level or user-mode requests (e.g., requests from a browser to display a web page, or to retrieve data from a database for display) may be considered data-plane operations. For a number of reasons described below, such as enhanced performance and security, the administrative or control-plane architecture for at least some of the services of a provider network may be implemented in a modular manner in some embodiments, so that at least some aspects of the logic involved in configuring various client-accessible service resources can be executed at locations and/or devices that are physically and/or logically separated from the service resources themselves.

Such a modular control-plane architecture may enable the implementation of service instances at new types of computing facilities that differ from the large-scale provider network data centers in several ways—e.g., in size (the number of service instances that can be established within a given facility), in the ease with which the facilities can be brought online or taken offline, and in the geographical proximity to targeted sets of application user endpoints. In at least some embodiments, the large-scale data centers may be organized by the provider network operator into a set of standard or baseline "regions" (e.g., with one or more data centers located in a given geographical region), while the new (typically smaller) computing facilities may be organized into "micro-regions". Hierarchical units other than regions, such as availability containers (described below in further detail) or simply data centers may be used in some embodiments, either in addition to or instead of regions, and each such hierarchical unit may also be classified as either standard or micro depending on size and/or functional limitations. The subsequent discussion focuses primarily on regions as the infrastructure organization units that may be selected based on latency and/or other considerations for service instance placement; however, the techniques described with respect to regions may also be applied to other infrastructure organizational units such as data centers or availability containers in at least some embodiments.

In various embodiments, both standard regions and micro-regions may comprise instance hosts on which service instances can be configured; however, at least in some embodiments, the control-plane functions for various services may be managed primarily using control servers within the standard regions. That is, when various types of administrative operations have to be performed, such operations may be initiated by sending commands to instance hosts (which may be located in either type of region) from control servers located within standard regions. Any of a variety of different types of control-plane operations may be performed by the control servers, including for example authorization/authentication operations associated with configuration requests, capacity management operations, quota checks, interactions with other network-accessible services of the provider network (e.g., the acquisition of storage volumes from a storage service), billing account related operations associated with client requests, or concurrency control operations to manage concurrent updates to internal data structures of the service. The use of standard regions (which may typically have stronger and/or more mature security protocols in place than micro-regions) for managing administrative operations may have significant benefits in various embodiments, such as lowering the vulnerability of the services to network-based attacks, and reducing the complexity of deploying new versions of control software. The ability to implement at least some service instances at micro-regions may have several benefits, such as reduced latencies for various types of non-administrative or administrative operations when such operations are requested from endpoints nearer to the micro-region computing facilities.

A number of different types of network-accessible services may implement the modular control-plane architecture that enables the use of micro regions described above in various embodiments, such as the aforementioned virtual computing service, various storage-related services, database services, specialized parallel computing services, scientific computing services, and the like. A subset of the resources of any of these different services of the provider network may in some embodiments be offered for reservation by (and allocation to) clients in units called instances, such as virtual or physical compute instances, storage instances, or network resource instances. The term "service instances" is used herein to refer generically to these types of service units. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). Resource instances of various kinds, including virtual compute instances, storage resource instances or network resource instances, may be instantiated on systems termed "instance host platforms" or "instance hosts" herein. In some embodiments, an instance host capable of instantiating N different virtual compute instances of a particular type may, for example, comprise a hardware server with a selected set of relatively low-level software components initially installed, such as virtualization software and/or operating system software typically utilizing a small fraction of the hardware server's compute capabilities. As more virtual compute instances are launched, a larger portion of the server's compute capabilities may get used, e.g., for client applications running on the different virtual compute instances. A number of different types of computing devices may be used singly or in combination to implement the resources of the provider network in different embodiments, including general purpose or special purpose computer servers, storage devices, network devices and the like. In at least some embodiments, in addition to being used to configure resource instances on instance hosts within the provider network, at least some control servers of a given provider network may also be able to remotely configure instances hosted at platforms external to the provider network, e.g., in third party data centers or facilities, or at point-of-presence locations or similar facilities, as described below in further detail.

In at least some embodiments, a choice regarding the placement targets of service instances (e.g., whether a given set of instances is to be implemented at hosts located within a standard region, or within a micro-region) may be provided to clients of various network-accessible services implemented at a provider network. A set of placement target options may be identified for a given client by a placement manager component of a network-accessible service, based on various factors such as service characteristics (e.g., latency, availability, data durability) that are known (or inferred) to be of interest to the client, the types of applications the client is expected to run, the location of other resources of the clients, and so on. In some embodiments, a client may specify one or more service characteristics of interest (or even numerical target ranges for some service characteristics such as latency), and the placement manager may select the target placement options on the basis of such explicitly specified preferences. In other embodiments, the placement manager may infer the service characteristics to be used as placement target option selection criteria, e.g., based on the types of applications the client has run in the past, or the placement manager may use a default set of selection criteria. In one embodiment, programmatic interfaces implemented by the network-accessible service (e.g., web pages, APIs (application programming interfaces), GUIs (graphical user interfaces), command-line tools or the like) may be used to indicate several possible instance placement target options to a client. One placement target option (such as a micro region) may comprise a first set of instance hosts configurable to receive administrative commands over a network from remotely located control servers, e.g., from control servers located within other placement targets. A second placement target option (such as a standard region) may, for example, comprise a second set of instance hosts and a set of control servers configurable to transmit administrative commands to instance hosts (either to instance hosts in the same placement target or to instance hosts in other placement targets such as micro regions). A control server that coordinates or orchestrates configuration of service instances at one or more instance hosts that are located in a different facility from the control server (e.g., in a different standard or micro region, or in a different data center within the same region) may be referred to herein as a "remote" control server.

In some cases, micro regions may be formed using small-footprint data centers purchased or leased by the provider network operator. Micro regions may also be established using a number of other approaches in various embodiments, e.g., using (a) a shipping container-based computing facility, (b) a transportable data center that can be moved to a desired location, (c) a telecommunication provider equipment facility, (d) a client-owned computing facility, or (e) a third-party computing facility (i.e., a facility that is owned by neither the provider network operator nor the client on whose behalf service instances are to be configured). Some micro regions may comprise computing equipment owned and managed exclusively by the provider network operator, and may thus be considered part of the provider network; such micro regions may be deemed "internal" micro regions herein. Other micro regions may include computing facilities or equipment that are not owned or managed exclusively by the provider network operator, and may thus be termed "external" micro regions with respect to the provider network.

In some embodiments, one or more constraints may apply to some of the placement target options, but not to others. For example, in one embodiment the number of service instances that can be implemented (e.g., the total number and/or the number that can be allocated to a given client) in a micro-region may be smaller than the number that can be instantiated in a standard region. Such a constraint may be necessary, for example, simply because of the amount of computing equipment installable within smaller placement targets, and/or because of limits on network bandwidth in and out of the smaller placement targets. In some embodiments, the number of different operating systems (or different versions of operating systems) supported for compute instances may be lower at some placement targets than others, or the types of applications supported may differ from one placement target to another. The placement targets may also differ from each other in any of several other service characteristics in different embodiments, including for example in (a) an expected response latency range for one or more types of operations requested from various endpoints, (b) the security protocols in use, such as network security protocols and/or physical security protocols, (c) the geographic distance from one or more locations from which requests are expected to be received at the service instances implemented, (d) a supported availability level of the instance hosts or the service instances, (e) a supported data durability level, or (f) the pricing policy applicable to service instances with similar performance and/or functional capabilities. In at least some embodiments, indications of the constraints and/or other differences may be provided to service clients to enable them to make more informed choices for instance placement.

A client of a network-accessible service may submit a placement target selection request in some embodiments for one or more service instances, e.g., using one of the programmatic interface implemented by the service. If the client selects a placement target without control servers, such as a micro-region, the service may select one or more remote control servers at a different placement target to orchestrate the configuration of the service instances. If the client selects a placement target that does include control servers, a control server from the same placement target may be selected (although a remote control server, e.g., in a different region or a different data center, may still be selected in some cases). In either case, one or more instance hosts may be identified at an appropriate computing facility for the service instances that are to be configured. The selected control server may then be configured to coordinate the configuration of the instance host(s). In at least some implementations, a secure communication channel may be established between the control server (or servers) and the instance host (or hosts). When a service instance configuration request (such as a request to launch/stop an instance, attach/detach a storage device, and the like) is received from the client, a control server designated for the instances may typically perform some set of control-plane operations locally (such as authorization/authentication checks and the like), and then transmit one or more administrative commands to an instance host to configure the instance, e.g., via the secure communication channel. Only relatively simple low-level commands and/or associated metadata or data, determined at least in part based on the preliminary control operations performed at the control server, may be transmitted to the instance host for local execution in at least some embodiments. Results of the low-level commands may be transmitted back to the control server in such embodiments, and a corresponding response to the client configuration request may be provided from the control servers. After the instance has been configured as requested, one or more applications run on the instance may respond to non-administrative requests from application end users. If a micro region that happens to be located close to the end user endpoints is used for the instance, the latency of various types of non-administrative operations may typically be lower than the latencies that might have been achieved if a more distant standard region were used. Eventually, at the end of a monthly billing cycle or at the expiration of some other interval, a billing amount may be generated for the client for the service instances configured, and the pricing policy applicable to the placement target may be used to determine such a billing amount—e.g., different billing amounts may be generated for equivalent usage levels of equally capable service instances based on the placement of the service instances.

A client may explicitly choose a placement target for a service instance in some embodiments, from among a list or set of placement targets indicated by the service. In other embodiments, clients may specify desired latencies (or other service characteristics) for operations to be implemented at their service instances, and the service may select placement targets accordingly. For example, a client may indicate the maximum desired latency for responses to specified types of HTTP requests, when directed from a particular range of IP addresses or a specified geographical location to a web server to be launched at an instance I1. In response, the service may select an instance host for I1 at a micro region from which the probability of achieving the desired latencies is expected to be high, and a control server at a different region to manage the configuration of instance I1. In another example, a client may indicate a type of application to be run (e.g., a high-performance scientific processing task), and the service may select placement targets that have servers capable of running such applications. Thus, at least in some embodiments, the selection of the actual placement target for one or more instances may be performed by the service based on a set of requirements or preferences indicated directly or indirectly by a client.

In one embodiment, distinct respective sets or lists of candidate placement targets may be provided to different clients based on various factors, such as latency or other preferences indicated by the different clients, or information available to the service regarding the endpoints from which operations directed to the clients' applications are expected. For example, one client C1 may be presented with the following options for instance placement: standard region R1, micro region MR1, and micro region MR2, while another client C2 may be presented with a different set of options such as standard region R2 and micro region MR3.

According to one embodiment, the service may proactively (or in response to client requests) generate recommendations for instance placement. For example, consider a scenario in which a client C1 has an instance I1 implemented at a standard region SR1, to which application requests are being received from various endpoints. Various performance-related and other metrics associated with instance hosts and/or with specific service instances may typically be collected by the service, and/or may be made available to the service by the client C1. The metrics may be analyzed by the service in some embodiments to estimate whether improvements to response latencies or other measures may be achievable by transferring the instance I1 to a different placement target (or instantiating a replacement instance at a different placement target), such as a micro region MR1. If the service determines, e.g., using a predictive analytic or simulation model, that the probability of achieving significant latency improvement by re-locating the instance I1 is above some threshold, a corresponding recommendation may be generated and provided to the client. In some implementations, the service may even be able to identify (e.g., based on detailed analysis of network traffic metrics) various end-user endpoint IP address ranges for which latency or other performance improvements can be expected, and may include such target endpoint address information within the recommendations. As noted above, in some embodiments the service may attempt to generate such recommendations proactively, while in other embodiments clients may explicitly request that the service attempt to find such optimization opportunities, and recommendations may be generated in response to such requests.

In various embodiments, control software for managing service instances may generally be implemented so as to minimize the administrative overhead imposed on the instance hosts. Much of the configuration-related processing may be offloaded from the instance hosts, so that high-level decisions and metadata manipulation may be implemented at the control servers, while only simple low-level (and typically idempotent and stateless) configuration-related commands may have to be executed at the instance hosts themselves. Details about instance states and instance type definitions may not be required to be understood at the instance hosts in such embodiments. For example, in one such embodiment, a layered control software architecture may be employed at the control servers, in which an instance state manager responds to a client's instance configuration request by invoking a workflow manager component. In some implementations, components of the control-plane may be configured to perform authentication and/or authorization checks associated with client requests, e.g., by communicating with an identity management service implemented in the provider network. Other components may be involved in communicating with other network-accessible services, such as storage services or networking-related services whose resources may be needed to implement the desired configuration operations (e.g., attaching a storage volume, or activating a network interface) at the instance hosts. The workflow manager may translate a higher-level configuration decision (reached by the instance state manager in response to the client's instance configuration request), in the context of an instance configuration definition provided by a configuration definer component of the control software, into one or more lower-level workflow operations specific to that configuration definition. The workflow manager may in turn transmit the workflow operations to a command communicator component of the control software at the control server. The command communicator may securely submit one or more low-level commands (such as operating system commands or virtualization software commands), corresponding to a given workflow operation, to a particular instance host over a network, in accordance with a command protocol. In some implementations and/or for some types of commands, associated data, metadata and/or credentials (e.g., in the form of tokens for which a short-term validity period is determined at the control servers) may also be transmitted to the instance host.

At the instance host, a command receiver (such as a simple web server) may respond to a given command from the communicator by instantiating a remote command executor (RCE) in some embodiments. An RCE, which may comprise a single thread of execution (or a software process) spawned by the command receiver on demand, may at least in some embodiments only remain active long enough to issue one or more operations, typically directed to a virtualization software component, an operating system component, monitoring software or workflow software at the instance host. The RCE may exit or terminate after the operations have been initiated in such embodiments. The command receiver may provide, to the command communicator, return codes, standard output or error output generated by the RCE's operations. In some implementations, one or more metrics associated with the commands executed by the RCE may also be supplied to the control server, such as user/system/kernel runtime, resources used for the commands, or a list of the commands. The supplied results and/or additional information may be interpreted at the control server to determine the success or failure of the requested commands, and a response to the client's instance configuration request may be formulated accordingly in some embodiments. Thus, the instance configuration overhead at the instance hosts may be limited largely to the instantiation of the RCEs and the operations requested by the RCEs in such embodiments, thereby reducing the likelihood of attackers being able to access the control-plane algorithms or code, and also retaining the vast majority of the instance host resources for the use of the client-requested resource instances themselves. In some implementations, the encapsulation of configuration responsibilities at different layers of control server software may be efficient enough to allow hundreds or thousands of instance hosts to be remotely configured from a single control server or a few control servers. Such encapsulation may also enhance control-plane security, as only a few control servers in secure locations may be required to manage large numbers of instance hosts, thus reducing the number of servers that can be targeted for attack.

In at least some embodiments, instantiating an RCE may comprise instantiating at least one thread of execution in accordance with the Common Gateway Interface (CGI), e.g., by a web server. An efficient and well-known protocol such as HTTPS (a secure version of HTTP, the HyperText Transfer Protocol) may be used for command transmissions to instance hosts, and/or to receive results from instance hosts in some implementations. The commands themselves may be formatted in an industry-standard format or notation such as some variant of JSON (JavaScript Object Notation) or XML (Extended Markup Language) in some embodiments. In other embodiments, private or proprietary protocols and/or formats may be used. The command protocol used may support a plurality of command types, of which at least a subset are designed to be idempotent—e.g., if a particular idempotent command "cmd1" with a given set of parameters is issued more than once, the net effect of the multiple "cmd1" issuances is the same as the effect of a single issuance of "cmd1", and the second issuance and any later issuances of the command have no negative effects.

In some embodiments at least some of the provider network's standard regions may include one or more availability containers, which may also be termed "availability zones" herein. An availability container in turn may typically comprise one or more distinct locations or data centers, engineered in such a way that the resources in a given availability container are insulated from failures in other availability containers. That is, a failure in one availability container may not be expected to result in a failure in any other availability container; thus, the availability profile of a resource instance or control server is intended to be independent of the availability profile of resource instances or control servers in a different availability container. Clients may be able to protect their applications from failures at a single location by launching multiple application instances in respective availability containers. In some embodiments, micro regions may also be organized into availability containers, or a given micro region may be included within an availability container that includes at least some instance hosts of a standard region. When selecting a placement target, a client may indicate their choice in terms of availability containers rather than regions in some embodiments. As suggested earlier, other units for placement targets may be supported in some embodiments—e.g., clients may be able to select specific data centers for their instances.

In at least some embodiments, several or all of the components of the control servers, such as the workflow manager and the command communicator, may be implemented as nodes of a cluster whose size can be increased dynamically as needed. For example, there may be W workflow manager nodes and C command communicator nodes instantiated at a given point in time, and the number of nodes for each component may be increased or decreased as desired. A given hardware device may be used for one or more nodes of a given type of control server component in some implementations—e.g., it may be possible to allocate S control servers to host W workflow manager nodes and C command communicator nodes, where $S>=(W+C)$.

As noted above, a given instance host platform may be capable of supporting multiple service instances in some embodiments. Flexible mappings between the service instances on a given instance host and the control servers that manage them may be implemented in some such embodiments—e.g., one service instance SI-X on a host H1 may be managed by a control server CS1, while another service instance SI-Y on H1 may be managed by a different control server CS2. In at least some embodiments, a concurrency control mechanism may be implemented to prevent conflicting operations (e.g., two different commands to create a software storage device such as a file system with the same name or with conflicting names) from being attempted. For example, the number of concurrent configuration operations on a given instance host platform may be limited using locks in one implementation. A lock manager may be implemented in some embodiments, from which an exclusive lock (or a shared lock with restrictions on the number of sharers and/or the types of instance host operations allowed while holding the shared lock) has to be obtained prior to performing configuration operations on a given instance host. Concurrency control operations and interactions may also typically be restricted to control servers in at least some embodiments.

Example System Environment

FIG. 1 illustrates an example system environment, according to at least some embodiments. As shown, system 100 comprises a provider network 102 with a number of resources grouped into several different types of regions, e.g., based in at least some cases on geographical location. In some embodiments, clients of the provider network may typically be able to (or in some cases be required to) specify the region in which they wish to have a given service instance configured, or a default region may be selected for a client's service instances if none is specified. In at least some embodiments, the term region may be used primarily as a hierarchical unit of organizing the provider network resources rather than an indicator of geographical proximity, and all the resources defined within a given region need not necessarily be physically located very near each other. For example, two data centers located hundreds of miles apart may be designated as belonging to the same region; while two other data centers that are only a few dozen miles apart may be designated as belonging to distinct regions.

In the embodiment shown in FIG. 1, the resources of the provider network 102 may comprise two broad categories—control-plane resources used primarily for administrative operations of one or more network-accessible services of the provider network, and data-plane resources such as instance hosts used primarily to implement client-accessible and client-modifiable resources of the network-accessible services. Control-plane resources may typically not be modifiable by clients in some embodiments. In at least some embodiments, pools of control-plane servers (such as control server pools 120A, 120B and 120C) may be established in some types of regions, such as standard regions 103 or control-plane regions 114. A standard region 103 may comprise one or more (typically large) data centers such as 105A and 105B, each configured with both control-plane servers (e.g., control server pools 120A and 120B at date centers 105A and 105B respectively) and data-plane resources (e.g., instance host pools 110A and 110B). In some large provider network environments, standard regions may include data centers 105 housing tens of thousands of computing devices and the required support infrastructure (e.g., power and cooling); consequently, it may take a substantial budget and a substantial amount of time to establish such data centers. A control-only region 114 may comprise only control servers such as control server pool 120C of data center 105C, which may be used for remote administration of instance hosts in other regions.

In addition to standard regions 103 and control-only regions 114, a number of smaller regions, referred to as micro regions 153 (e.g., 153A, 153B, 153C, 153D, 153E, 153F and 153G), may be configured in the depicted embodiment. Some micro regions 153 (e.g., 153A, 153B, 153C and 153D) may comprise computing equipment and/or support infrastructure that is owned and managed by the provider network operator, while other micro regions may include equipment shared with clients or third parties (entities that may not utilize any of the provider network services directly), or owned or managed entirely by clients or third parties (e.g., micro regions 153E, 153F, or 153G). A micro region may typically comprise some number of instance hosts that can be configured to implement service instances of one or more network-accessible services of the provider network 102. In some embodiments, the instance host pools of the micro regions 153 may be constrained in various ways relative to the instance host pools 110 of the standard regions 103—e.g., in that a given client may not be permitted to configure as many service instances in a given micro region as in a standard region, or in that a more limited set of operating systems or applications may be supported in a given micro region than in a standard region, or the maximum amount of time for which a service instance can be reserved may be shorter in a micro region than in a standard region. Such instance host pools may accordingly be referred to as constrained instance host pools 170 herein.

A number of different approaches may be taken to implementing a micro region 153 in various embodiments. Some micro regions, such as micro region 153A with constrained instance host pool 170A, may comprise one or more computing facilities 129 built using shipping containers. In some implementations, such a shipping container-based facility may be brought online fairly quickly, e.g., in response to a detection of growing demand for one or more services in a city that is located far from a large data center 105 of the provider network. Container-based facilities may also be relatively easy to dismantle, e.g., if and when a larger or replacement data center becomes operational. In some cases, transportable computing facilities such as 131A or 131B (e.g., computing equipment that remains loaded on trucks or train cars) may be used for a micro region 153B. The constrained instance host pools of such moveable computing facilities, such as 170B and 170C, may be ideal for implementing event-specific or short-duration applications, such as streaming music applications developed for music festivals and the like. In some cases, at least some of the transportable computing facilities 131 may themselves use shipping containers to house computing equipment. Micro region 153C comprising constrained instance host pool 170D may be implemented at an edge data center 133 (e.g., a data center that is physically linked to external networks not managed or owned by the provider network). In some cases, other types of small-footprint data centers 135 may be used for instance host pools 170E of a micro region 153D.

Equipment located at a third-party data center, such as a data center 125 owned by a telecommunication provider or an internet service provider (ISP) may be used for a constrained instance host pool 170F of a micro region 153E in some embodiments. In one embodiment, clients that access some of the network-accessible services of the provider network 102 may wish to use some of their own equipment to implement service instances. For example, a micro region 153F comprising constrained instance host pool 170G at a client data center 127 may be established. Transportable computing facilities 137 that are owned/managed by entities other than the provider network operator, and may therefore be referred to as "external" transportable computing facilities, may also be used for constrained instance host pools 170H of micro regions such as 153G in some embodiments. It is noted that in various embodiments, a given micro region 153 need not necessarily comprise just one category of computing facility: for example, a client data center 127 and an external transportable computing facility 137 may both be designated as part of the same micro region 153 in some embodiments. In some implementations, one or more control servers may be included within a given micro region in addition to the constrained instance host pools.

A client may be able to select the placement target for a given set of service instances from among the various types of regions shown in FIG. 1 that comprise instance host pools, including standard regions 103 and micro regions 153 in the depicted embodiment. The administration and configuration of service instances at various instance hosts may be coordinated by control servers located in standard regions 103 or control-only regions 114 in the depicted embodiment. A placement manager 180 may be responsible in the depicted embodiment for, among other operations, selecting control servers to be used for various service instances. The placement manager may also implement programmatic interfaces enabling clients to select the placement target regions in which various service instances should be configured on their behalf, or to indicate preferences for various service characteristics such as desired latencies, availability, data durability and like, that can be used by the placement manager to select placement target options on the client's behalf. In some embodiments, if the client does not explicitly indicate preferred service characteristics, the placement manager may infer at least some of the service characteristics that are likely to be of importance to the client, e.g., based on an analysis of the client's past resource usage, or on indications of the kinds of applications the client intends to run. Based on either explicit or inferred preferences, one or more service characteristics may be identified as selection criteria for placement targets for a particular client. A set of candidate regions including one or more micro regions 153 and one or more standard regions 103 may be selected as placement target options to be offered to the client. An indication of the candidate regions may be provided to the client programmatically, e.g., via web page or in response to an API invocation.

In at least some embodiments, various characteristics and/or constraints of a micro region may also be indicated programmatically to the client. For example, applicable constraints on instance counts, operating systems, application types, instance allocation time periods and the like may be indicated to the client. In some embodiments, expected response latency differences for one or more types of operations among the candidate placement targets may also be indicated. In at least one embodiment, the client may also be informed regarding other service characteristics such as the geographical locations of the regions (e.g., the distance from the client's own offices or facilities), the jurisdictional authorities or legal systems that apply to the regions (which may often be dependent on the geographical locations), the pricing policies applicable at different for a particular category of service instances, the supported availability levels of service instances at the different regions, supported data durability levels, or differences in security policies (if any) between the candidates.

The client may select a particular region as a placement target for a given service instance, such as a compute instance on which one or more applications are to be run on behalf of the client. A control server to configure the service instance at the selected region may be identified (e.g., by the placement manager 180) and an instance host at which the service instance is to be configured may also be identified (either by the placement manager 180 or by the control server). If a micro region is selected for the service instance, the control server may be located in a different region than the instance host. A secure communication channel may be established between the control server and the instance host. Subsequently, when a configuration request for the service instance (e.g., a request to start or stop the service instance, or to attach/detach a network-accessible storage device) is received from the client, the control server may transmit administrative commands to the instance host to accomplish the desired configuration. Once the service instance is configured as requested, the client may execute various applications using the service instance. End users of the applications may submit non-administrative (e.g., user-mode or application-level) requests to the applications from endpoints 198 in the embodiment depicted in FIG. 1. In at least some cases, if an end point 198 is located near a micro region 153 at which the application is executed, lower latencies for various types of operations may be experienced by the end users than if a standard region 103 had been used for the application. Billing amounts for the use of various service instances may be dependent on the placement of the instances in some embodiments—e.g., it may be the case that a service instance launched in a nearby micro region may cost more to a client than an equivalent service instance launched at a more distant (and hence higher-latency) instance host located in a standard region.

In one embodiment, instead of selecting a set of candidate regions for a client and allowing the client to select one of the candidates, the placement manager 180 may itself select the region based on the client's expressed preferences (e.g. latency requirements) or on preferences inferred by the placement manager (e.g., based on analysis of the client's current or planned applications). Control plane components of the various services implemented at the provider network may collect various types of metrics in different embodiments, e.g., to manage the health and availability of various service instances. In some implementations, one or more service components may be able to identify service instances that are candidates for transfers to other regions, based on possible performance improvements that could be achieved as a result of the transfers. For example, based on response times collected and analyzed for various operations at a web server implemented by a given client C1 using an instance I1 located in a standard region 103, and on lower response times collected from instances launched for other clients in a micro region 153, it may be possible to generate a recommendation to the client C1 to move the instance I1 to the micro region 153. Such recommendations may be generated in some embodiments, for example by an optimizer component of placement manager 180, either proactively or in response to client requests for optimization recommendations.

In the embodiment depicted in FIG. 1, the control servers selected for various instance hosts may be able to administer the instance hosts remotely over network connections, regardless of whether the instance hosts are in the same region as the control server (e.g., both the control server and an administered instance host may be located within a standard region 103), at a micro region 153 within the provider network, or at a micro region 153 outside the provider network. It is noted that the placement manager 180 may comprise a plurality of software and/or hardware components in some embodiments, some of which may themselves be distributed among the various types of regions illustrated in FIG. 1. In other embodiments, a centralized placement manager may be used.

Placement Manager Interactions

Figure 2:
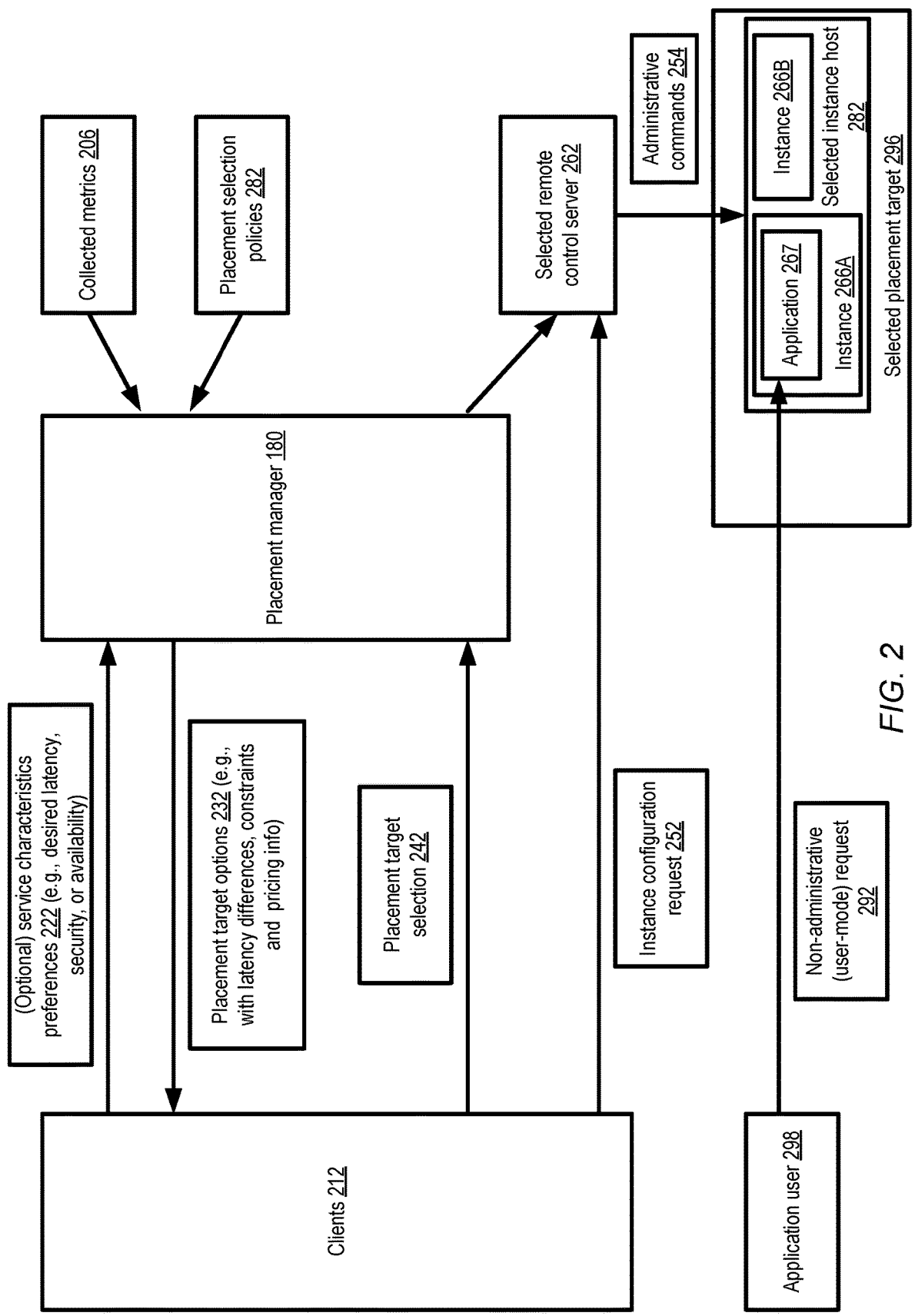
FIG. 2 illustrates examples of interactions involved in selecting placement targets for service instances based on latency and/or other factors, according to at least some embodiments.

FIG. 2 illustrates examples of interactions involved in selecting placement targets for service instances based on latency and/or other factors, according to at least some embodiments. As shown, clients 212 may optionally submit an indication of preferences 222 with respect to one or more service characteristics to the placement manager. For example, a desired latency range for one or more types of application-level requests expected to be received from some set of end-user endpoints 198 may be provided to the placement manager 180 in the depicted embodiment, or a desired level of availability or security may be indicated by the client. In some cases latency preferences for configuration requests or other administrative requests may also be provided instead of or in addition to latency preferences for non-administrative operations. A set of programmatic interfaces (e.g., web pages or web sites, APIs, GUIs, or command line tolls) may be implemented by the placement manager 180 for such service characteristic preferences and/or for the other interactions with the client 212.

The placement manager 180 may provide a set of placement target options 232 to the client in the depicted embodiment, e.g., regardless of whether the client submitted service characteristic preferences 222 or not. The decision as to whether to include a particular placement target in the set of options may be based at least in part on an analysis of the differences in service characteristics among the available placement targets—e.g., the differences in latencies expected for various types of operations, differences in availability or data durability, the security protocols used in different placement targets, differences in the performance capabilities of the instance hosts, and so on. In some embodiments, even if the client does not explicitly provide any preferences, the placement manager 180 may nevertheless evaluate various placement options with respect to service characteristics that are considered likely to be important to the client, and are hence identified as selection criteria for the placement options. For example, if a client already has web servers responding from a set of instances to end user requests received mostly from a particular geographical region, the latency of web server responses may be considered an important service characteristic for the client. In some cases, functional or scalability preferences may be deduced for a client—e.g., for a client that already uses specialized compute instances configured for high-end scientific computations, candidate placement target options that support such compute instances may be selected. The placement target options selected may include one or more regions of the provider network in some embodiments, including standard regions 103 and/or micro regions 153. The expected differences in response latencies for some set of operations (e.g., non-administrative operations such as HTTP requests, when requested from some range of network endpoints) may be indicated for the different options in some implementations. The pricing policies applicable to various types of service instances, as well as any applicable constraints on the service instances at the different placement targets, may also be provided to the client in various embodiments. In some embodiments, when selecting a candidate set of placement options to be presented to the client, the placement manager 180 may refer to collected metrics 206 (e.g., metrics associated with other service instances of the client, which may be helpful in identifying the types of applications and the client's currently-achieved latencies) and/or to various placement selection policies 282 (e.g., policies that include heuristics to be used to select micro regions for service instances based on factors such as the expected size of the client's service instance fleet).

The client 212 may submit a placement selection request 242 to the placement manager 180, indicating a particular placement target 296 at which a service instance (such as instance 266A) is to be configured on the client's behalf. The placement manager 180 may select a control server 262 (e.g., at a standard region 103 or a control-only region 114 of the provider network) to orchestrate the configuration of the service instance. In some embodiments, an instance host 282 may also be selected by the placement manager 180 at the placement target indicated by the client. The control server 262 may be located in a different region than the instance host 282 in some cases (e.g., if the placement target is a micro region 153, and/or if the control server 262 is in a control-only region). In some embodiments, the network-accessible service being implemented at the instance host 282 may be multi-tenant, and other instances such as 266B may be implemented on behalf of other clients at the same instance host 282. In at least one implementation, the instance host 282 may be selected by the control server 262 rather than by the placement manager 180. A secure network communication channel may be established between the control server 282 and the instance host 262. When the client submits an instance configuration request 252, one or more corresponding administrative commands 254 may be transmitted by the control server 262 to the instance host 282. It is noted that in some embodiments, a placement target selection 242 may be combined with an instance configuration request 252—e.g., the client may issue a single request to launch an instance at a specified placement target, and the placement manager may transmit the configuration request to a selected control server on the client's behalf. Users 298 of application 267 being run at the client's service instance 266A may submit non-administrative or user-mode requests 292 and receive corresponding responses. The response latencies experienced by the users 298 may be dependent at least in part on the placement target selected for the client's service instance.

Control Server Components

Figure 3:
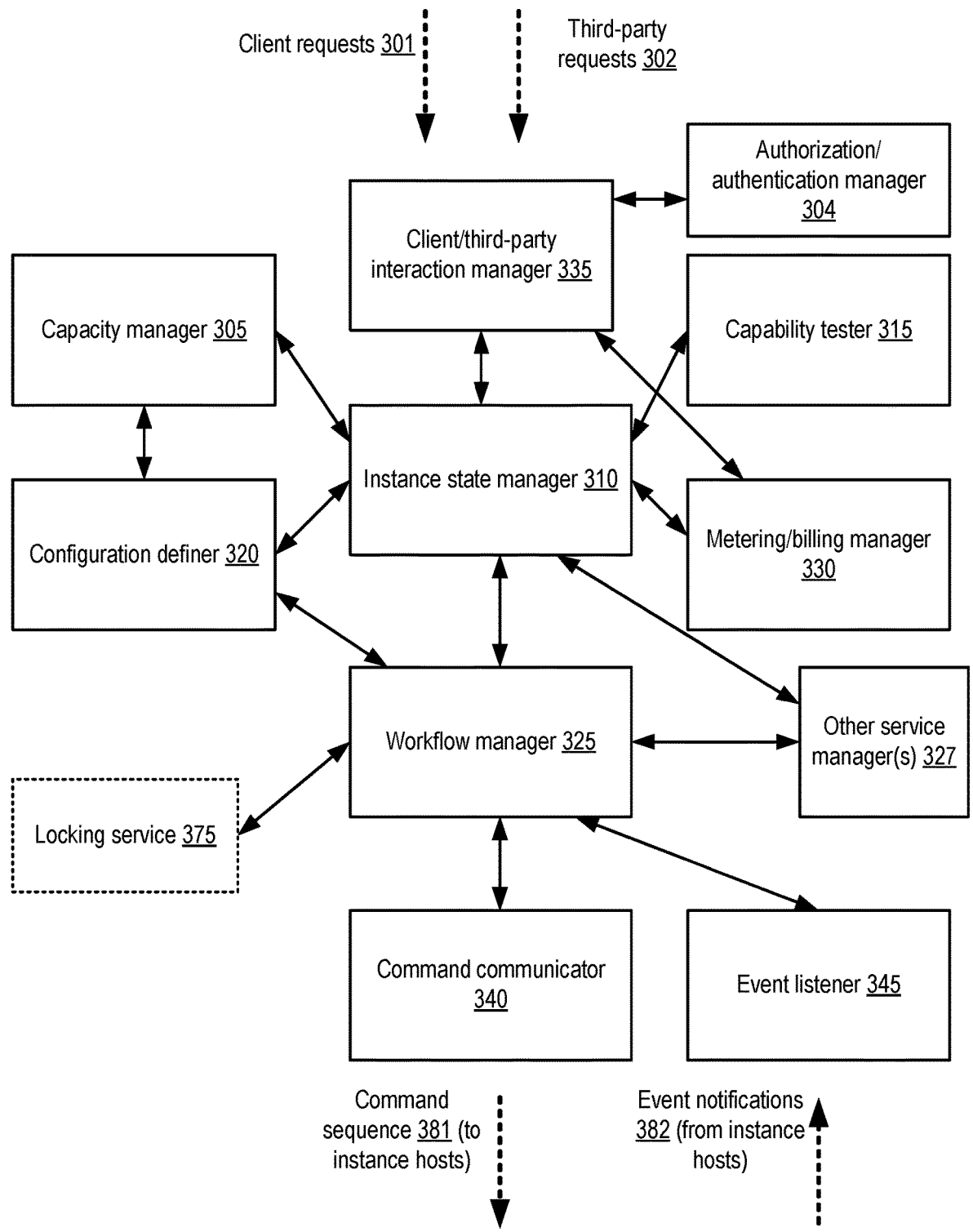
FIG. 3 illustrates example components of control servers configured for remote configuration of instance hosts, according to at least some embodiments.

As described above, control servers 262 may be selected by a placement manager 180 for orchestrating configuration of service instances at hosts located within selected standard regions or micro regions. FIG. 3 illustrates example components of control servers usable for remote configuration of instance hosts, according to at least some embodiments. The mapping between the illustrated components, and hardware/software servers on which the components are implemented, may vary over time and in different embodiments. For example, in some implementations, it may be possible to instantiate each of the illustrated components on a single computing device, while in other embodiments, one or more computing devices may be used for instances or nodes of a particular component (e.g., multiple workflow manager nodes may be instantiated, with one or more workflow manager nodes incorporated at a given computing device). In one implementation, each of the depicted components may be implemented using at least a respective operating system process.

A client and third party interaction manager component 335 may be responsible for receiving incoming client requests 301 and/or third party requests 302, such as instance launch or configuration requests, or approval requests for third party or client-owned instance hosts in the depicted embodiment. Is some embodiments, one or more programmatic interfaces (such as web pages, web sites, APIs, graphical user interfaces or command-line tools) may be implemented to support the client interactions and/or third party interactions. Instance state manager 310 may be responsible for orchestrating configuration operations in response to client or third-party requests, for responding to outages or unexpected instance shutdowns, and/or for registering new instance hosts in the depicted embodiment. For example, in response to an instance launch request from a client, the instance state and recovery manager 310 may identify (with the help of capacity manager 305) exactly which instance host is to be used for the launch, and may then issue a launch command to the workflow manager 325, to be translated into lower-level commands for eventual execution at the selected instance host. Authorization/authentication manager 304 may be responsible for verifying the identity and/or permissions of the clients and/or third parties whose configuration requests are received. In at least some embodiments, the authorization/authentication manager 304 may also be responsible for generating credentials to be used at the instance hosts to implement some types of configuration operations. In some embodiments, an identity management service may be implemented at the provider network, and the authorization/authentication manager 304 may interact with (or comprise an element of) the identity management service.

Capacity manager 305 may be configured in the depicted embodiment to ensure that instance host pools 110 are adequately sized for the expected demand, and/or to move resources between pools if needed. In some scenarios, instance hosts or other platforms external to the provider network may be tested (e.g., for performance and/or functionality) before they are approved to host service instances. Capability tester 315 may be configured to run tests (such as performance tests, security-related tests, software stack confirmations, and the like) to help with the decision to approve candidate platforms and/or to verify that instance hosts within the provider network are adequately provisioned.

Metering/billing manager 330 may be configured to determine, based for example on metrics such as network request counts, measured traffic, I/O counts, CPU utilization and the like, how much a given client is to be charged for using a particular resource instance over a billing period, in accordance with the particular pricing plan in effect for the client. Metering/billing logic may include information about different pricing rules to be applied based on service instance placement targets in at least some embodiments.

Configuration definer 320 may be responsible in the depicted embodiment for generating, for a particular instance type to be launched, details of a specific configuration layout (e.g., names of various file systems and software devices to be set up, parameter values for various tunable settings, and the like) to be implemented at a particular instance host. Workflow manager 325 may be responsible for receiving the high-level command issued by the instance state manager 310 and configuration layout details from the configuration definer 320, and translating the command into a workflow that includes one or more lower-level commands. Workflow manager 325 may then hand off the workflow commands to the command communicator 340, which may transmit the corresponding command sequence 381 (e.g., formatted in JSON or XML) to a selected instance host (e.g., via HTTPS) for execution via RCEs. In at least one embodiment, some of the configuration operations to be performed at the instance hosts may require the acquisition and/or configuration of resources at other network-accessible services of the provider network—e.g., a storage device implemented by a storage service may need to be obtained or configured for a compute instance at an instance host, or a virtual network interface managed by a networking service may need to be configured for a compute instance. In such an embodiment, the workflow manager 325 and/or the instance state manager 310 may communicate with administrative components of such other services, e.g., with service managers 327, to obtain and/or configure the resources at the other services before the low-level commands are sent to the instance hosts.

In some embodiments, a locking service 375 may be used by the workflow manager 325 (or by other components illustrated in FIG. 3) to ensure that an instance host configuration does not get corrupted due to conflicting or overlapping modification requests—e.g., an exclusive lock on an instance host may be required before a configuration change of a particular type is allowed. Logical processes responsible for making ownership/assignment decisions for various components and/or tasks of the system may also require concurrency control. In some embodiments, the locking service 375 may be a component of the control servers, while in other embodiments it may be an external entity. For example, a pre-existing locking service used for other purposes in the provider network may be used, or a new locking service may be used. A control server may also include an event listener 345 in some embodiments, configured to receive notifications when certain types of events (such as unexpected shutdowns, hardware or software errors or failures that may affect resource instances) occur at instance hosts. The event listener 345 may transmit the information about events to the instance state manager in some embodiments, which may interpret them appropriately to determine, for example, whether instance state information needs to be updated. In at least some embodiments, command communicator 340 may also submit low level commands to the instance hosts to collect performance or other metrics from the instance hosts, e.g., on behalf of metering manager 330; in such embodiments, the set of commands issued by the command communicator may include non-modifying commands for metrics collection, as well as modifying commands to implement configuration changes.

It is noted that while instance state manager 310, as indicated by its name, may be aware of the state of various resource instances, lower-level components such as workflow manager 325, command communicator 340, and/or event listener 345 may be stateless, at least in the sense that knowledge of, or details about, instance state may not be needed by such lower-level components to perform their functions in the depicted embodiment. By restricting information about instance states to a limited set of components, the implementation of stateless components such as the workflow manager and the command communicator may be substantially simplified in such embodiments. It is also noted that while the double arrows of FIG. 3 indicate examples of some of the types of interactions that may occur between the various control server components illustrated, additional types of interactions may also be supported between the components in at least some embodiments—e.g., any one of the components may be able to communicate with any other component in some embodiments.

Instance Host Components

Figure 4:
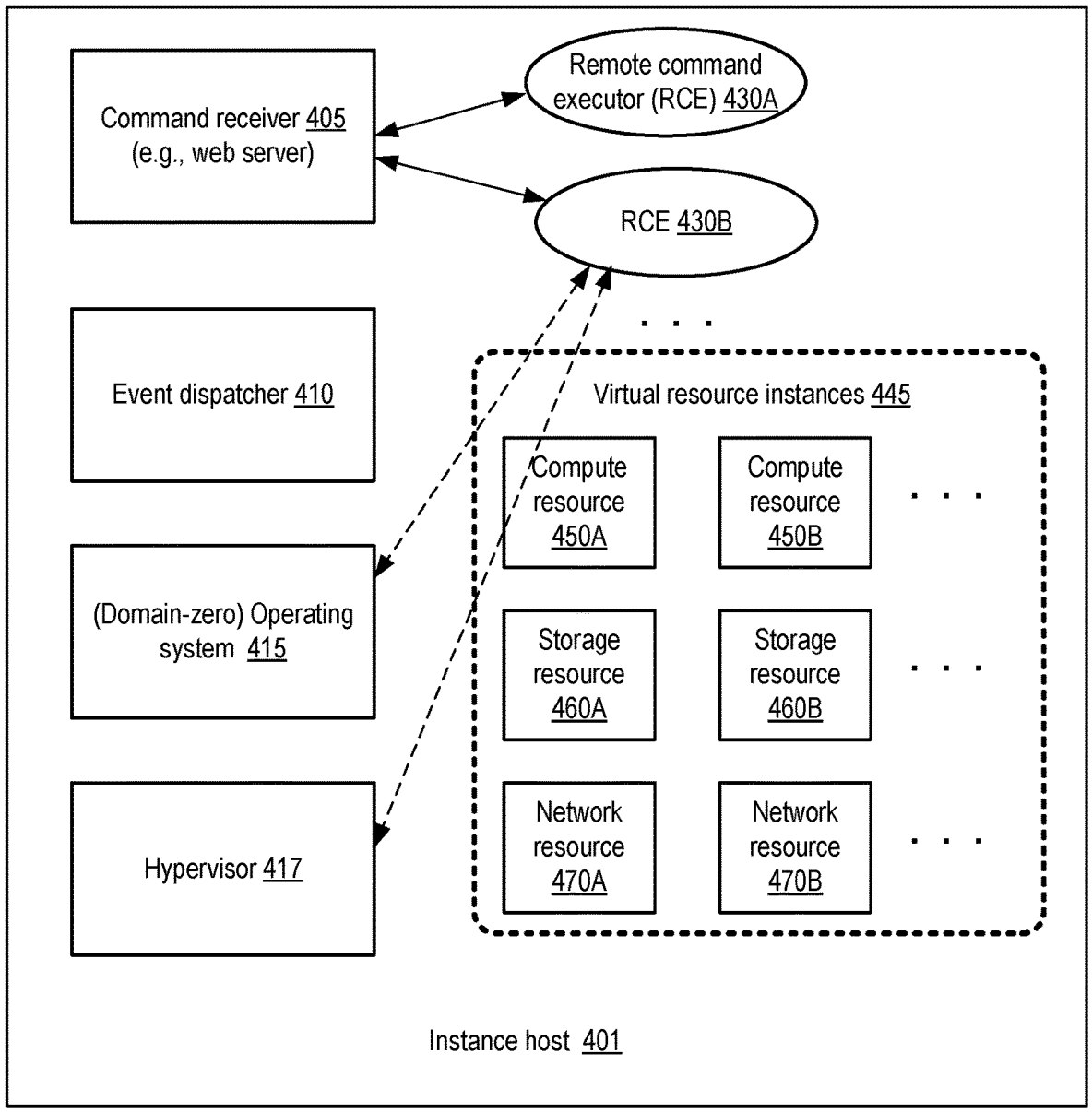
FIG. 4 illustrates example components of instance hosts, according to at least some embodiments.

FIG. 4 illustrates example components of an instance host 401, according to at least some embodiments. As shown, the instance host may include a command receiver component 405, such as a web server, configured to receive the sequence of commands generated by the command communicator 340 of the control server. The instance host may also include a hypervisor 417 providing the virtualization functionality on top of the bare hardware of the host. The hypervisor 417 may organize the resources of the instance host platform into a plurality of domains in the depicted embodiment, with one domain (which may be called domain zero) being used for administration, and the other domains being used for resource instances. An instance of an operating system 415 may be set up in domain zero. In response to each received command, or to a sequence of commands, the command receiver 405 may instantiate a remote command executor (RCE) 430, such as 430A or 430B. The RCE 430 may then issue a request for an operation, e.g., an operation directed to the hypervisor 417 or a set of system calls directed to the domain-zero operating system 415. Depending on the specific commands being implemented, in some embodiments credentials or metadata sent from the control server may also be used for the commands; in some cases, encrypted data (e.g., client application data) may also be used. In some embodiments RCE 430s may be considered, or implemented as, components of the domain-zero operating system 415 or the hypervisor 417. After issuing its operation request(s), and receiving the results (including for example return codes, error output or standard output), a given RCE may terminate or exit in the illustrated embodiment. The RCE may exit or terminate of its own accord in some implementations, while in other implementations an RCE may be terminated by the command receiver 405 (e.g., using a "kill" signal or some other mechanism). In other embodiments, RCEs may remain in existence for longer time periods than needed just to initiate a given operation—e.g., a pool of RCEs may be maintained. In at least one implementation, each RCE may represent a CGI process or thread of execution. In some embodiments, an RCE may start a long-running operation and exit, and the results of the long-running operation (which may continue after the RCE exits) may be obtained asynchronously by the command receiver.

The operations initiated by the RCEs may (if the operations succeed) eventually result in the implementation of the configuration commands from the workflow manager 325, resulting for example in the instantiation of (or configuration modifications of) various virtualized resource instances 445, such as compute resources 450A or 450B, storage resources 460A or 460B, or network resources 470A or 470B. The RCEs and the command receiver may also be stateless with respect to instance state, in the sense that they may be unaware of what state a particular instance is in at a given time, in the depicted embodiment. In some embodiments where the instance host is organized into domains by the hypervisor, each virtual resource instance may correspond to a respective domain. The instance host may also comprise an event dispatcher 410 in the depicted embodiment. The event dispatcher may subscribe to one or more event monitors (e.g., monitors implemented within the hypervisor 417 or the domain-zero operating system 415). The event monitor(s) may notify the event dispatcher if and when certain types of events occur at the instance host, and the event dispatcher may notify the event listener 445 at a control server about the events, either directly or via the command receiver in various embodiments.

Example Control Server Request/Response Interactions

Figure 5:
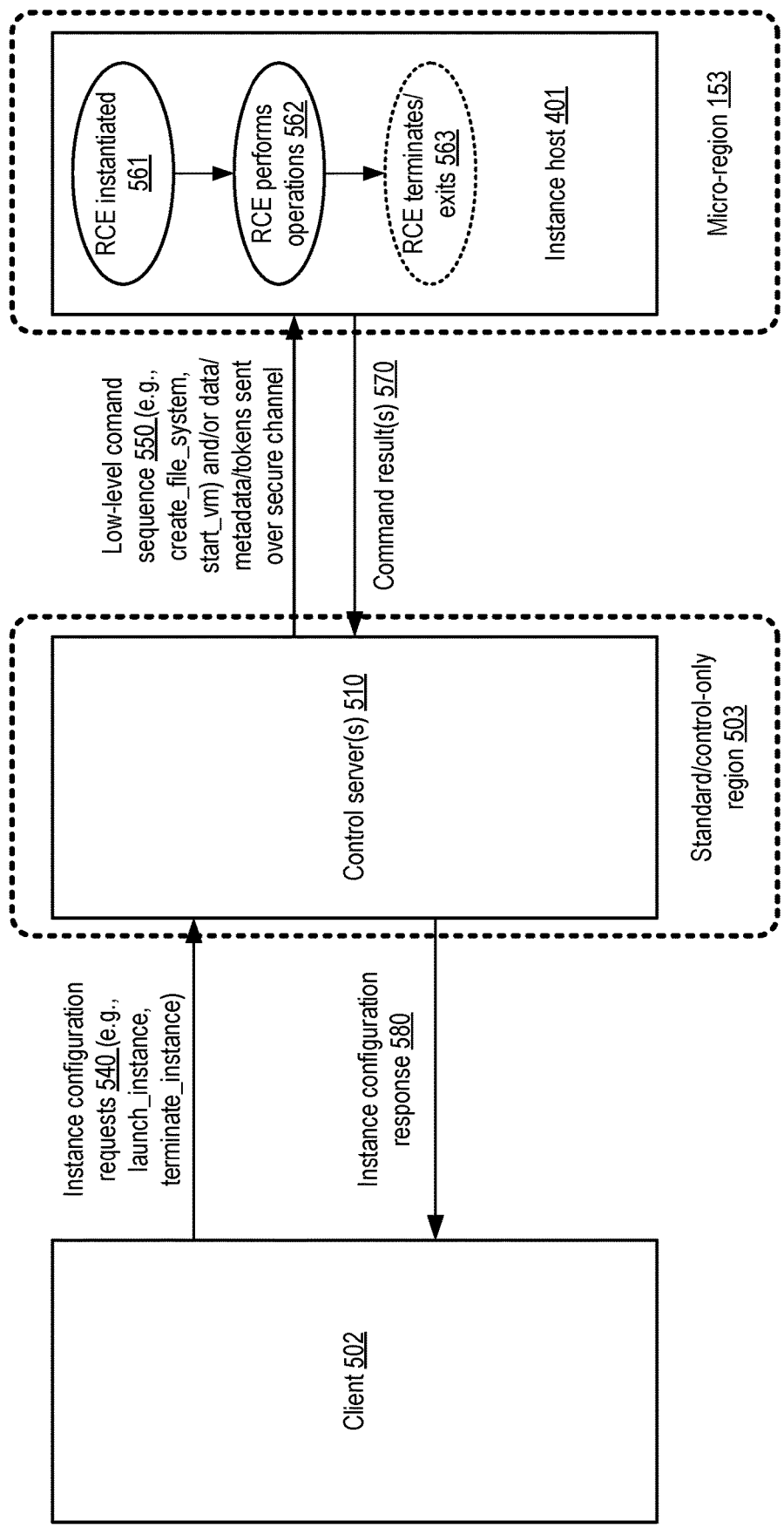
FIG. 5 illustrates example interactions between clients, control servers, and instance hosts, according to at least some embodiments.

FIG. 5 illustrates example interactions between clients, control servers, and instance host platforms, according to at least some embodiments. As shown, a client 502 of a network-accessible service may submit an instance configuration request 540 to a control server 510 that has been selected as described above (e.g., on the basis of client-specified placement preferences) for an instance host of the network-accessible service in the depicted embodiment. The client request may be transmitted via a programmatic interface such as a web page or an API implemented by an interaction manager component 335 of a control server 410 in some embodiments. A number of components of the control server architecture (such as the instance state manager 310, the workflow manager 325 and/or the command communicator 340) may cooperate to translate the instance configuration request into a sequence of low-level commands 550 that are transmitted to the instance host 401. In some embodiments, for certain types of commands 550, associated data, metadata and/or credentials in the form of tokens may also be sent to the instance host 401. As shown, the control server 510 selected for the instance host 401 may be in a different region (e.g., a standard or control-only region 503) than the instance host (shown in a micro region 153), and hence may be considered a remote control server for the instance host 401.

The low-level command may be translated into RCE operations in the depicted embodiment at the instance host platform 401. As shown, an RCE may be instantiated (element 561 of FIG. 5), e.g., by spawning a new process or thread, the RCE may issue or perform one or more operations (element 562), and then exit or terminate (element 563). The results 570 of the commands may be sent back to the control server 510. Based on the results 570, an instance configuration response 580 may be sent back to the requesting client 502. Command sequence 550 and/or results 570 may be transmitted using any appropriate secure networking protocol, such as HTTPS, in various embodiments. The commands and results may be formatted in accordance with a variant of JSON or XML in some embodiments. The command protocol used may support at least some idempotent operations in various embodiments. In some embodiments, the command protocol may support a variety of other command types and functions including performance metrics collections, log record collection and the like—e.g., in order to determine billing amounts for a client that owns one or more resource instances at the instance host platform 401, low-level commands may be issued by the control server 510 to determine how many operations of various kinds the client issued to the instances, or how much network traffic the client incurred at the instance host platform. In some implementations, a mechanism other than RCEs may be used for certain types of control server-requested operations such as metrics or log record collection, while in other implementations RCEs may be used for both configuration modification and metrics/log collection. According to at least one embodiment, encrypted metadata or encrypted credentials may be sent to the instance host 401 by the control server 510 to be used for the low-level commands.

Figure 6:
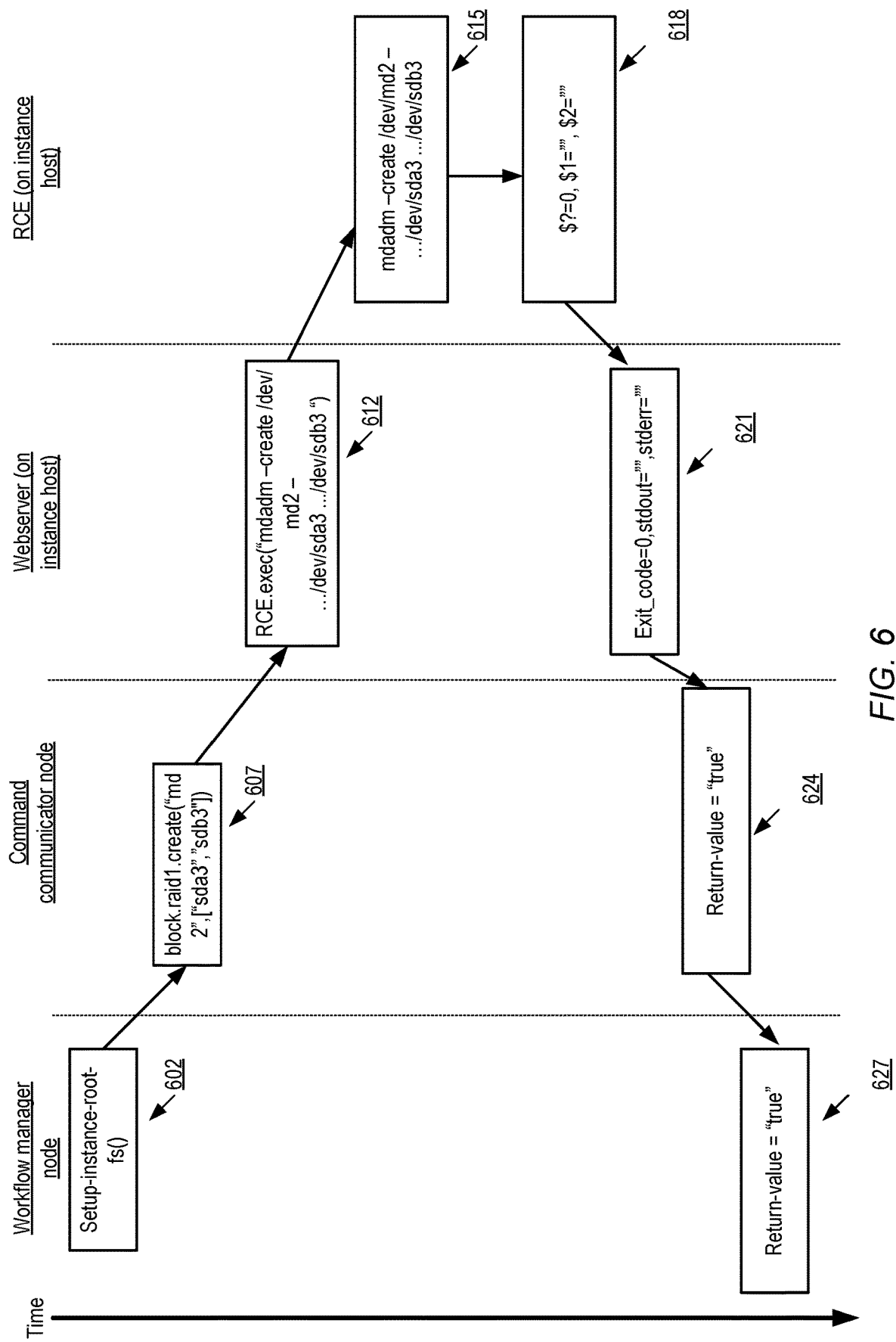
FIG. 6 illustrates an example of command flow starting from a workflow manager node at a control server, according to at least some embodiments.

FIG. 6 illustrates an example of command flow starting from a workflow manager node at a control server, according to at least some embodiments. The illustrated example deals with the creation of a software RAID (redundant array of independent disks) device at an instance host, which may represent part of the configuration required to set up a new virtual compute instance. The command flow is provided here to illustrate, using a concrete example, the level of command detail at which different components of the control server and the instance host may operate in one embodiment; many other types of configuration operations, unrelated to RAID devices, may be implemented using commands of similar granularity in various embodiments. Elapsed time increases from the top to the bottom of FIG. 6.

The workflow manager 325 may receive a high-level request to set up a root file system for a compute instance (element 602 of FIG. 6) in the depicted embodiment, e.g., from instance state manager 310 in response to a client's request for a new compute instance. The workflow manager 325 may submit, to the command controller 340, a command "block.raid1.create" directed to a block device subsystem (element 607), requesting creation of a RAID1 device with specified parameter values (e.g., for software device names such as "md2", "sda3" and the like). The workflow manager 325 may have determined the parameter values based at least in part on a configuration definition or layout obtained from the configuration definer 320 for the new instance to be created.

In response to the "block.raid1.create" command, the command communicator 340 may submit an "RCE.exec" command to the instance host's command receiver 405 (element 612). The command receiver 405 may in turn instantiate an RCE process or thread that executes the requested operation, in this case an invocation of an "mdadm" (multiple device administration) command at the domain-zero operating system layer (element 615). The RCE process or thread may obtain the return value or exit code from the invocation (the "$?" value in element 618), the standard output from the invoked operation (the "$1" value in element 618), and the standard error from the invoked operation (the "$2" value in element 618). These results may be transmitted by the command receiver back to the command communicator 340 (element 621). The command controller 340 may in turn translate the results into a return value (e.g., "true", indicating success in this example) for "block.raid1.create" command it had received, and transmit the return value back up to the workflow manager 325 (element 624). The workflow manager 325 may similarly determine a return value for the "setup-instance-root-fs" command it had received, and provide this return value (also "true" in this example) to the instance state manager (element 627). It is noted that the various components whose interactions are illustrated in FIG. 6 may not be aware of instance state information, which may be maintained by the instance state manager; instead, each of the depicted layers may simply perform lower level operations as needed, the accumulated results of which may contribute to a change in instance state (e.g., to a launch, a reconfiguration, or a termination of an instance).

HTTPS Command Requests and Responses

Figure 7:
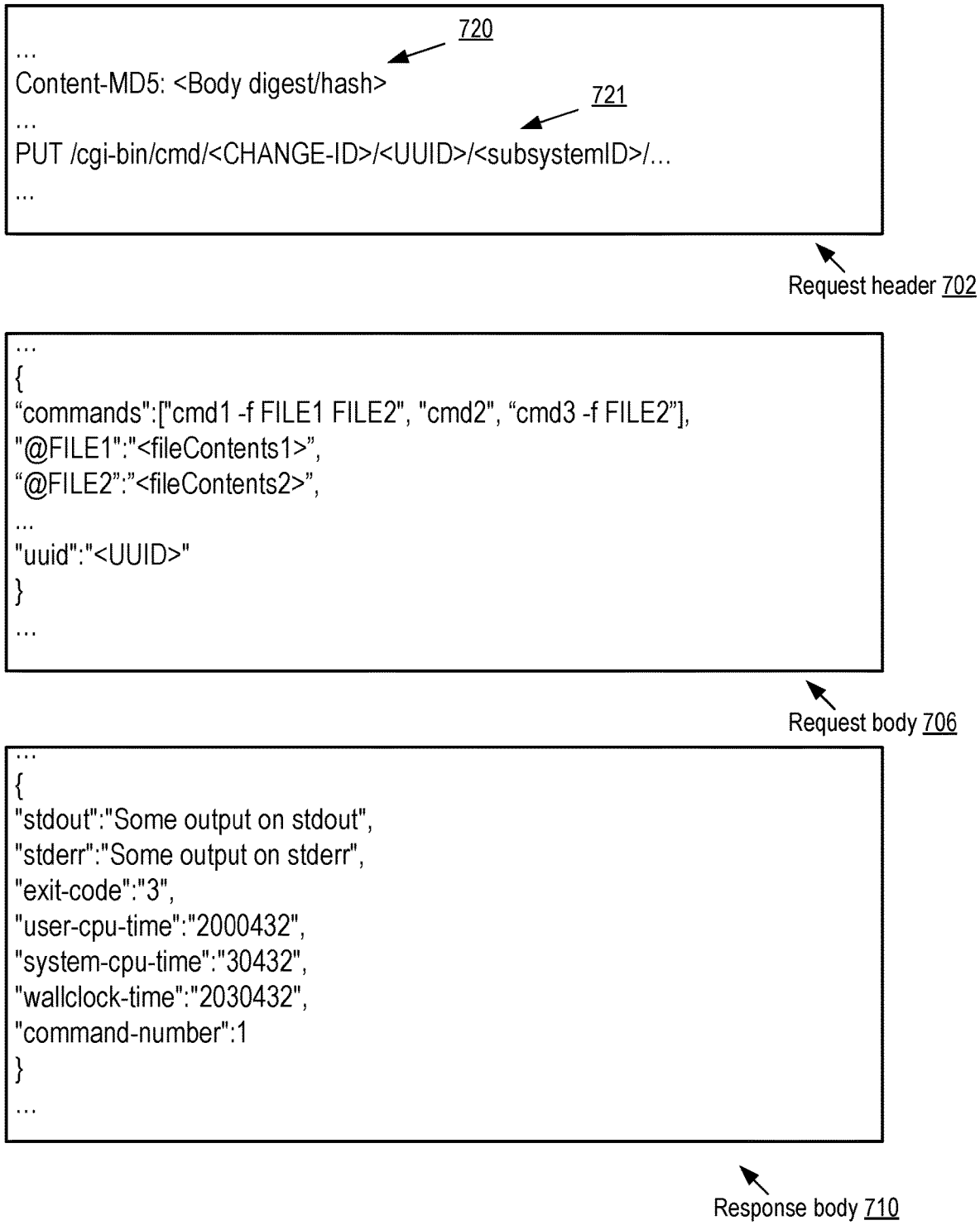
FIG. 7 illustrates example elements of command requests issued to an instance host from a control server, according to at least some embodiments.

In at least some embodiments, as noted earlier, communications between the control servers and the instance hosts may be implemented using a secure protocol such as HTTPS. FIG. 7 illustrates example elements of command requests issued to an instance host from a control server, according to at least some embodiments. The HTTPS requests and responses formats used may comprise a plurality of headers and body elements, of which only a few examples are provided in FIG. 7. As shown in element 702, a request header used for a command sent to the instance host's command receiver from a control server's command communicator may include a digest or hash value 720 determined from the body of the request, so that the integrity of the request body can be verified at the instance host. The request header may specify the HTTP "PUT" verb or request method, as shown in element 721, with a resource name that includes a "CHANGE-ID", a "UUID", and a "subsystemID". The CHANGE-ID may represent the specific client request that led to the command being issued; the CHANGE-ID corresponding to a given client request may be assigned for example by the client interaction manager 335 in some embodiments, and may be passed as a parameter in the command and response flow between the different components of the control server such as that illustrated in FIG. 6. A universally unique identifier or UUID may be generated for the specific command request in the depicted embodiment, e.g., the command communicator 340 may generate a distinct UUID for each command request it sends to the instance host. The subsystem identifier may indicate the specific subsystem at the domain-zero operating system or hypervisor layer that is to be used to perform the requested operation in the depicted embodiment. In at least some embodiments, log records may be generated when a command request is sent, received, or when the corresponding operation is executed at the instance host, and the log records may include some or all of the CHANGE-ID, the UUID, and the subsystem ID, allowing for easier debugging or correlation analysis.

The body 706 of the HTTPS request may include a sequence of commands in accordance with a defined command protocol, specified using a JSON-like syntax in the depicted example of FIG. 7. In some embodiments, the command protocol may allow the specification of file contents within the request body 706, where the file contents may serve as parameters of some or all of the commands. For example, in FIG. 7, the contents (e.g., in URL-encoded hexadecimal form) of two files with labels @FILE1 and @FILE2 may be included in the request body. As show, the keyword "commands" may indicate the sequence of commands included in the request. Three commands—"cmd1", "cmd2" and "cmd3" are shown in the sequence. "cmd1" has two file parameters FILE1 and FILE2, whose respective contents are indicated by @FILE1 and @FILE2. "cmd2" does not have any file parameters, while "cmd3" has a single file parameter FILE2. According to the command protocol in use, when an operation corresponding to "cmd1" is executed at the instance host via an RCE, the contents of @FILE1 and @FILE2 would be provided as parameters for the operation in the depicted embodiment. Similarly, when an RCE performs an operation corresponding to "cmd3", the contents of @FILE2 would be provided as a parameter. The specification of files in the request body in the manner shown in FIG. 7 may represent a convenience function in the depicted embodiment; other approaches, such as separate messages containing the file contents, may be used in other embodiments. In some embodiments, the command protocol may require that the commands be executed at the instance host in the order in which they appear in the request body; in other embodiments, such an ordering may be not be required. In one implementation, a maximum limit may be imposed on the number of commands that can be transmitted in a single request. In other implementations, no limit on the number of commands may be imposed. The UUID of the request header may be included in the body, as shown in FIG. 7, in some embodiments. Different formats than the JSON-like format shown in FIG. 7, such as XML, may be used to indicate the command sequence in other embodiments.

In some embodiments, the reply to the command request may include separate clauses or elements for each of the commands of the sequence. The response clause for the first command in the command sequence of request body 706 ("cmd1—F FILE1 FILE2") is shown in response body 710 for one embodiment. The "command-number" value ("1" in the depicted example) indicates that the clause is for the first command of the sequence. The standard output produced by the execution of the first command is indicated in the "stdout" field. The standard error output is indicated in the "stderr" field. The exit-code of the command (e.g., a value returned by the operating system or hypervisor component used) is indicated in the "exit-code" field. In addition, the response clause contains metrics for the wall-clock time (the elapsed time taken to complete the command on the instance host), as well as system and user CPU times indicating resource usage taken for the command at the instance host, expressed in units such as microseconds or milliseconds. Other formats than those shown in FIG. 7 may be used for commands and/or for command responses in various embodiments.

Methods for Selecting and Using Placement Targets

Figure 8:
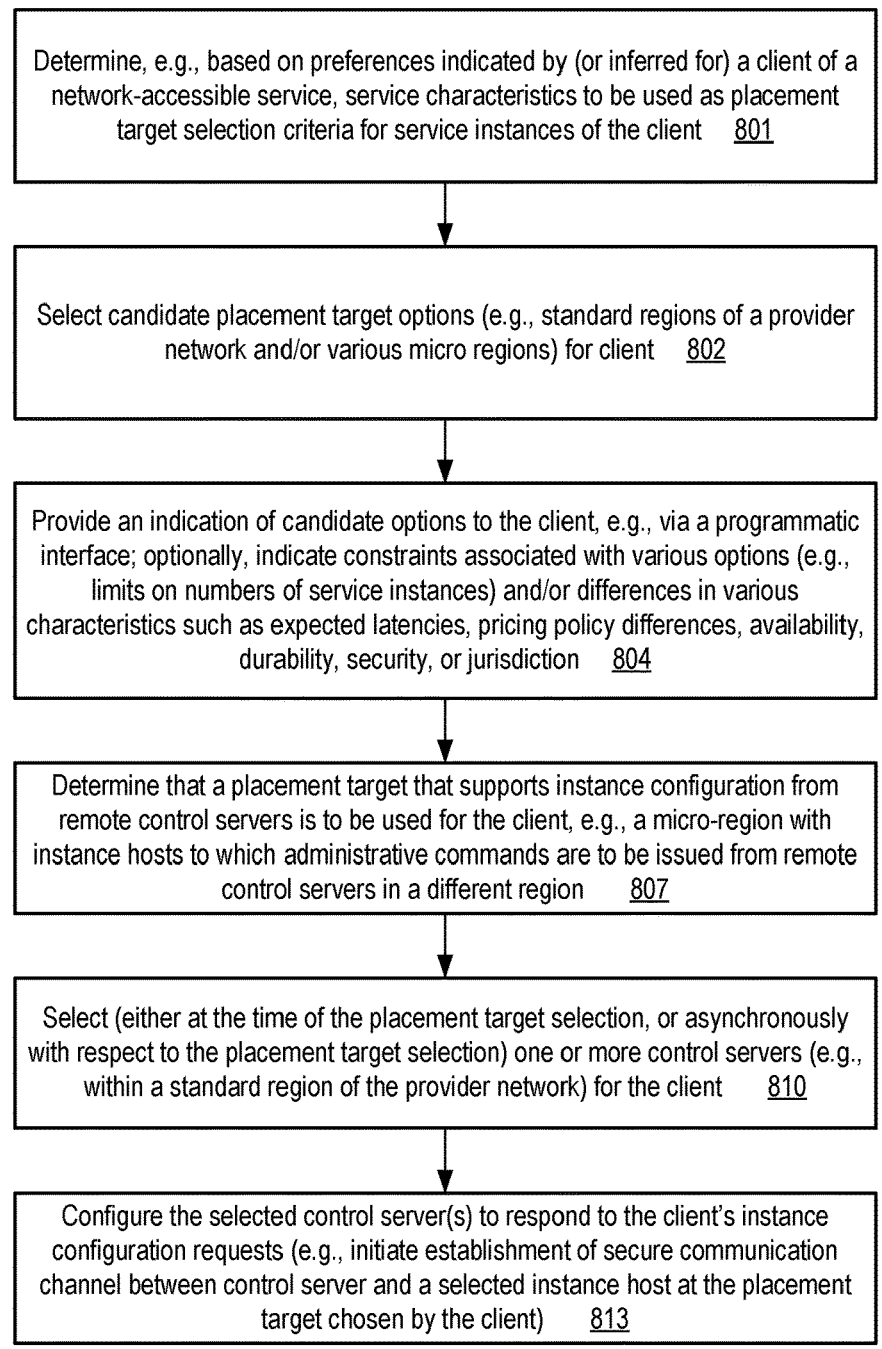
FIG. 8 is a flow diagram illustrating aspects of operations that may be performed to support client selection of placement targets for service instances, according to at least some embodiments.

FIG. 8 is a flow diagram illustrating aspects of operations that may be performed to support client selection of placement targets for service instances, according to at least some embodiments. As shown in element 801, one or more service characteristics that are to be used as selection criteria for placement targets for a given client of a network-accessible service may be determined, e.g., based on explicit or inferred preferences of the client. In accordance with the criteria, a set of candidate placement target options, such as one or more standard regions and/or one or more micro regions, may be selected (element 802). In some cases, the candidates may be selected based on latency preferences indicated by the client (e.g., the client may request that certain types of web services requests, when issued from a certain geographical location, should preferably be responded to within X milliseconds). A number of service characteristics other than latency may also or instead be considered when selecting placement target options for a given client in various embodiments. For example, differences in throughput capacity for various types of operations, availability, data durability, pricing, security protocols, and the like among the placement targets may be taken into account. In some embodiments, the client may not explicitly indicate preferences for latency or other service characteristics; instead, the placement manager may infer service characteristics that are likely to be important to the client, e.g., based on an analysis of the client's existing instances or based on some knowledge of the client's planned applications. Candidates may be identified in some embodiments on the basis of metrics collected with respect to one or more applications, such as the client's existing applications or applications similar to those the client is expected to run. In other embodiments, the candidates may be identified without using any client-provided preferences or collected metrics. In at least some embodiments the placement targets may be selected based on the location (or IP addresses) of the client's office premises or data centers. In some cases, the service may simply generate a list of all the available placement targets (such as all the regions of the provider network) that may be available to the client. The granularity of the placement targets may differ in different implementations—e.g., in some provider networks and/or for certain types of network-accessible services, placement targets may be indicated at the data center level, or at an availability container level instead of being specified in terms of regions. The classification of a set of computing resources into a placement target such as a particular region or a particular availability container need not necessarily imply anything about the geographical location of the resources in at least some embodiments.

The identified placement target(s) may be indicated to the client (element 804), e.g., by a placement manager 180 via one or more programmatic interfaces such as a web page, an API, a GUI, or a command line tool. In at least some embodiments, various constraints and/or service characteristics of the different placement targets may also be indicated. For example, one placement target may differ from another in expected latencies for various types of administrative and/or non-administrative operations, or the set of operating systems, applications or software stacks supported at one target may be different from those supported at another placement target. Pricing policies may differ from one placement target to another, e.g., for a compute instance with a given performance or functional capability set, the use of a micro region's resources may cost more than the use of a standard region's resources. Differences among the targets with respect to jurisdictional authority, geographical distance from a client facility, a supported availability level of service instances, a supported data durability level, or security policies may also be indicated to the client in at least some embodiments.

A determination may be made, e.g., by the placement manager 180, that a particular placement target whose instance hosts can be configured remotely (e.g., a micro region) is to be used for a client's service instances (element 807). For example, the client may explicitly inform the service about the placement target, e.g., via a programmatic interface. In some cases the client may simply issue a programmatic request to configure one or more service instances at a particular placement target, for example. Alternatively, a service component such as the placement manager 180 may interpret the client's latency preferences, and/or other preferences, to select the placement target on behalf of the client (e.g., the client may not have to select a placement target as long as the client's requirements for service characteristics such as latency, pricing, etc. are met). One or more remote control servers (e.g., at a standard region) may be selected to coordinate/orchestrate the configuration of the client's service instances at the selected placement target (element 810). Such a selection may be performed at the time that the placement target is selected for the client in some embodiments. In other embodiments, the control server selection may be asynchronous with respect to the placement target selection, e.g., it may be deferred until an instance configuration request is received from the client. The control server or servers may be selected based on any of various factors such as their current workload levels, their proximity to the client's facilities from which instance configuration requests are expected to originate, and the like. The selected control servers may then be configured to respond to the client's subsequent instance configuration requests (element 813), e.g., the establishment of secure network connections to instance hosts to be used for the client's instances at the selected placement target may be initiated.

Figure 9:
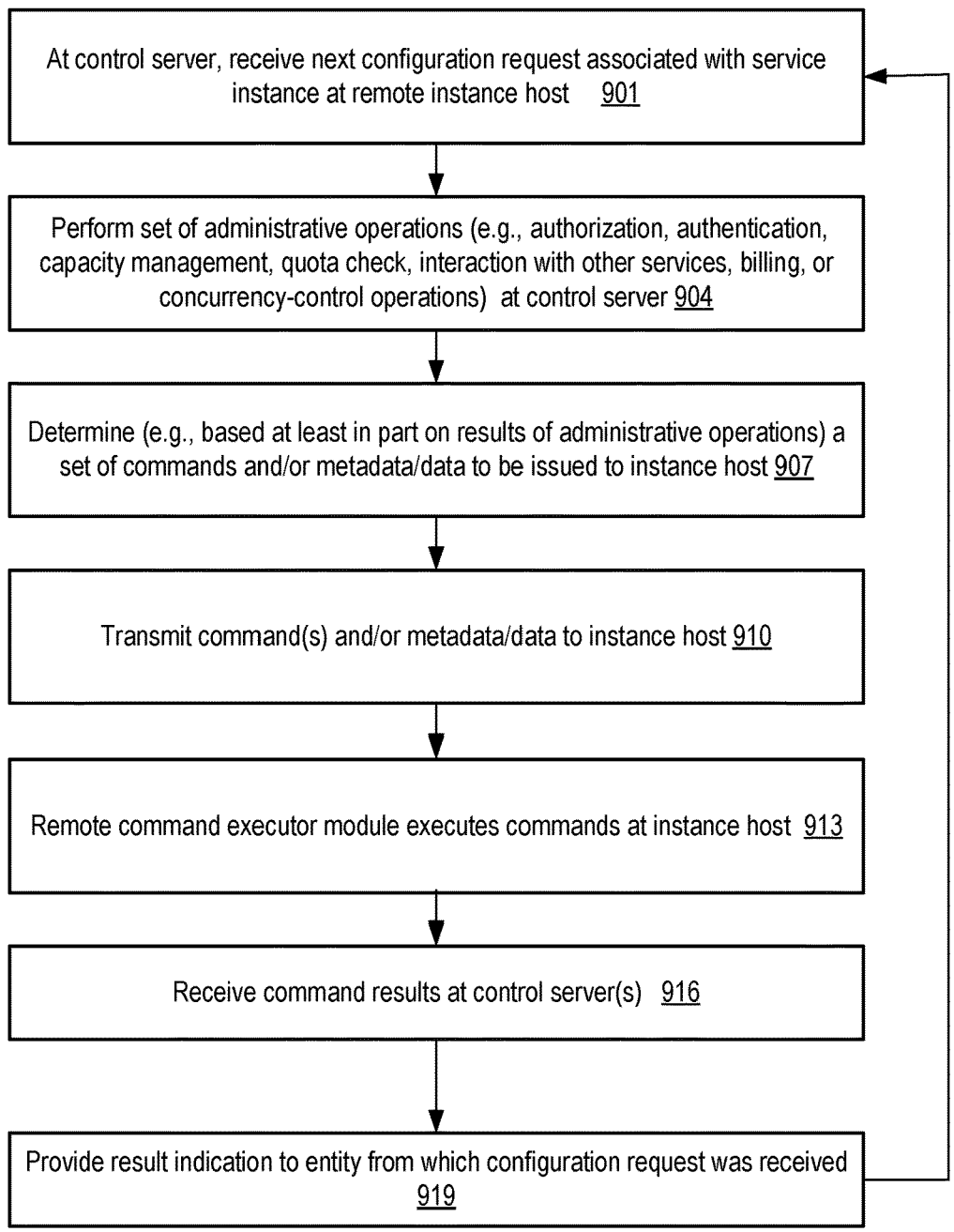
FIG. 9 is a flow diagram illustrating aspects of interactions between control servers and instance hosts, according to at least some embodiments.

FIG. 9 is a flow diagram illustrating aspects of interactions between control servers and instance hosts, according to at least some embodiments. As shown in element 901, a control server of a particular network-accessible service may receive, e.g., from a client or from an administrator, the next instance configuration request for a particular service instance implemented at a remote instance host. For example, the control server may be located within one data center of a standard region, and the instance host may be located within a micro region, at a different data center of the standard region, or at a different data center of a different region. A set of preliminary administrative operations may be performed by the control server (element 904), such as various tasks related to authentication, authorization, capacity management, quota checks, interactions with other services, billing, or concurrency control. A set of lower-level commands to be sent to the instance hosts, together with associated data and/or metadata may be determined (element 907).

The commands and the associated data and/or metadata may then be transmitted to the instance host (element 910), e.g., using a secure network connection to a command receiver module 405 similar to that shown in FIG. 4. At the instance host, the commands may be received and executed (element 913), e.g., by a remote command executor module. Command results and/or associated metrics may be returned to the control server (916). The control server may in turn provide an indication of the result of the configuration request to the entity (e.g., the client or the administrator) from which the configuration request was received (element 919). Operations corresponding to elements 901 onwards may be repeated for subsequent configuration requests.

Figure 10:
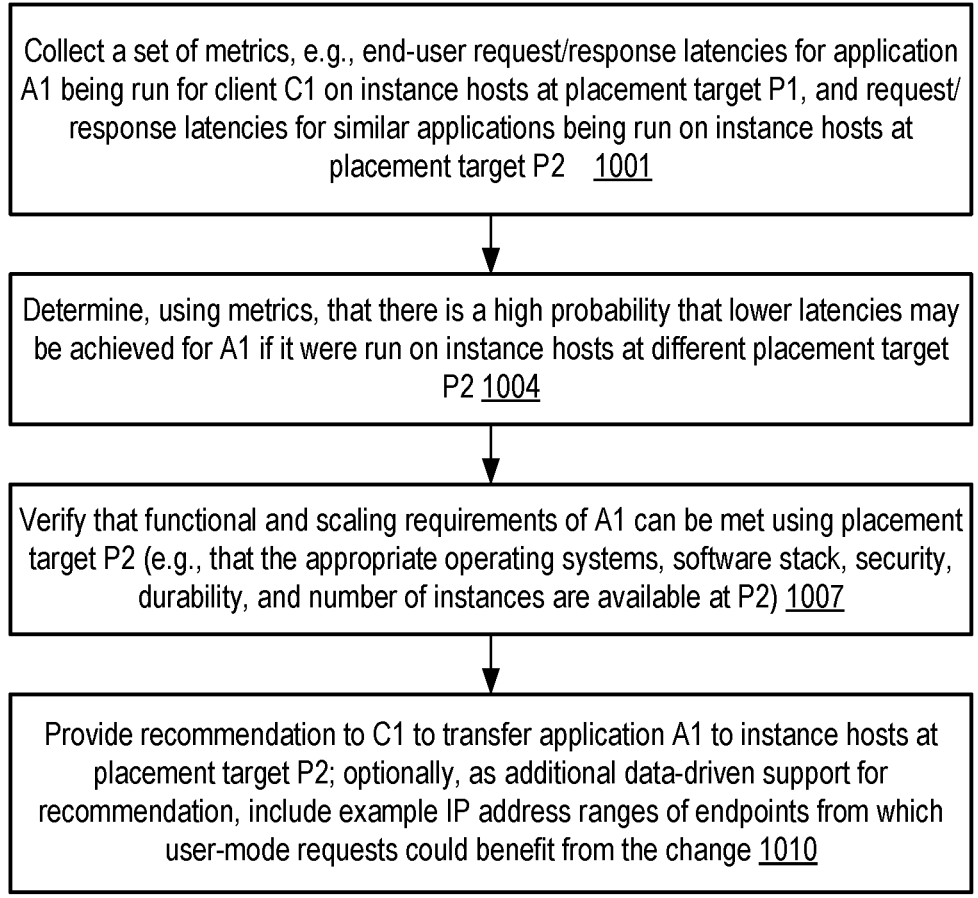
FIG. 10 is a flow diagram illustrating aspects of operations that may be performed to generate instance placement recommendations, according to at least some embodiments.

In some embodiments, it may be possible to improve the latencies achievable for various types of application operations by choosing instance placement targets appropriately. FIG. 10 is a flow diagram illustrating aspects of operations that may be performed to generate instance placement recommendations, according to at least some embodiments. As shown in element 1001, a set of metrics may be collected, e.g., by control servers or by a placement manager of a network-accessible service, such as the end-user request/response latencies for various types of operations at an application A1 being run for client C1 at instance hosts of a placement target P1 (e.g., a standard region). In addition, similar metrics may be collected for similar applications being run at a different placement target P2 (e.g., a micro region). The collected metrics may then be analyzed, e.g., by an optimizer control-plane component of the network-accessible service, to estimate the probability of performance improvements (such as lower latencies) if the application A1 were instead to be implemented at a different placement target such as P2.

A determination may be made that the probability of significant improvements in latency or other performance metrics as a result of transferring the application to the different placement target is high, e.g., above a particular threshold (element 1004). The service may then verify that the different placement target is capable of supporting the functional and scaling requirements of the client's application, e.g., that there are sufficient instance hosts available, and that the client's preferred operating system, software stack, data durability level, availability level etc. can be supported (element 1007). As noted earlier, some placement targets such as micro regions may have various constraints on the service characteristics supported, and the verification process may involve determining whether such constraints are likely to be acceptable to the client. If the different placement target is found to be capable of supporting the client's application A1, a recommendation may be provided to C1 to transfer the application to instance hosts at P2 (element 1007). In at least some embodiments, additional data (e.g., based on the metrics whose analysis led to the recommendation) may be provided to support the recommendation. For example, the service may provide examples of IP address endpoints from which application requests have been received in the past, and the corresponding response latencies achieved, or the service may provide some indication of the expected deltas in latency.

It is noted that in various embodiments, operations other than those illustrated in the flow diagrams of FIGS. 8, 9 and 10 may be implemented to support the various techniques described for supporting the client-directed selection and use of placement targets, and that some of the operations shown may not be implemented, or may be implemented in a different order or in parallel rather than sequentially. For example, multiple client configuration requests may be handled in parallel in some embodiments instead of using the sequential approach shown in FIG. 9.

Use Cases

The techniques described above, of implementing an efficient, modular architecture for control-plane operations of various network-accessible services to enable the use of new, more flexible types of computing facilities, may be beneficial in various types of environments. They may be particularly useful in environments where the demand for a service that is used for latency-sensitive applications is growing from a number of geographically dispersed areas, such that it is not feasible to build up large data centers near all the different demand centers. The ability to set up small-footprint data centers, container-based data centers, or transportable computing facilities relatively quickly as micro regions may help meet the latency requirements of various types of applications, including for example video game development environment applications, financial applications, and the like. In some cases, it may even be possible to configure small-footprint computing facilities for temporary or short-term events such as music festivals, concerts, or political conventions, and provide similar levels of service using such facilities as can be provided using much more expensive large data centers. Small-scale computing facilities may also be helpful from a risk management point of view, e.g., in view of unstable political environments, the different sets of laws that apply in different jurisdictions, or even variations in the level of economic activities in different geographies over time.

Illustrative Computer System

Figure 11:
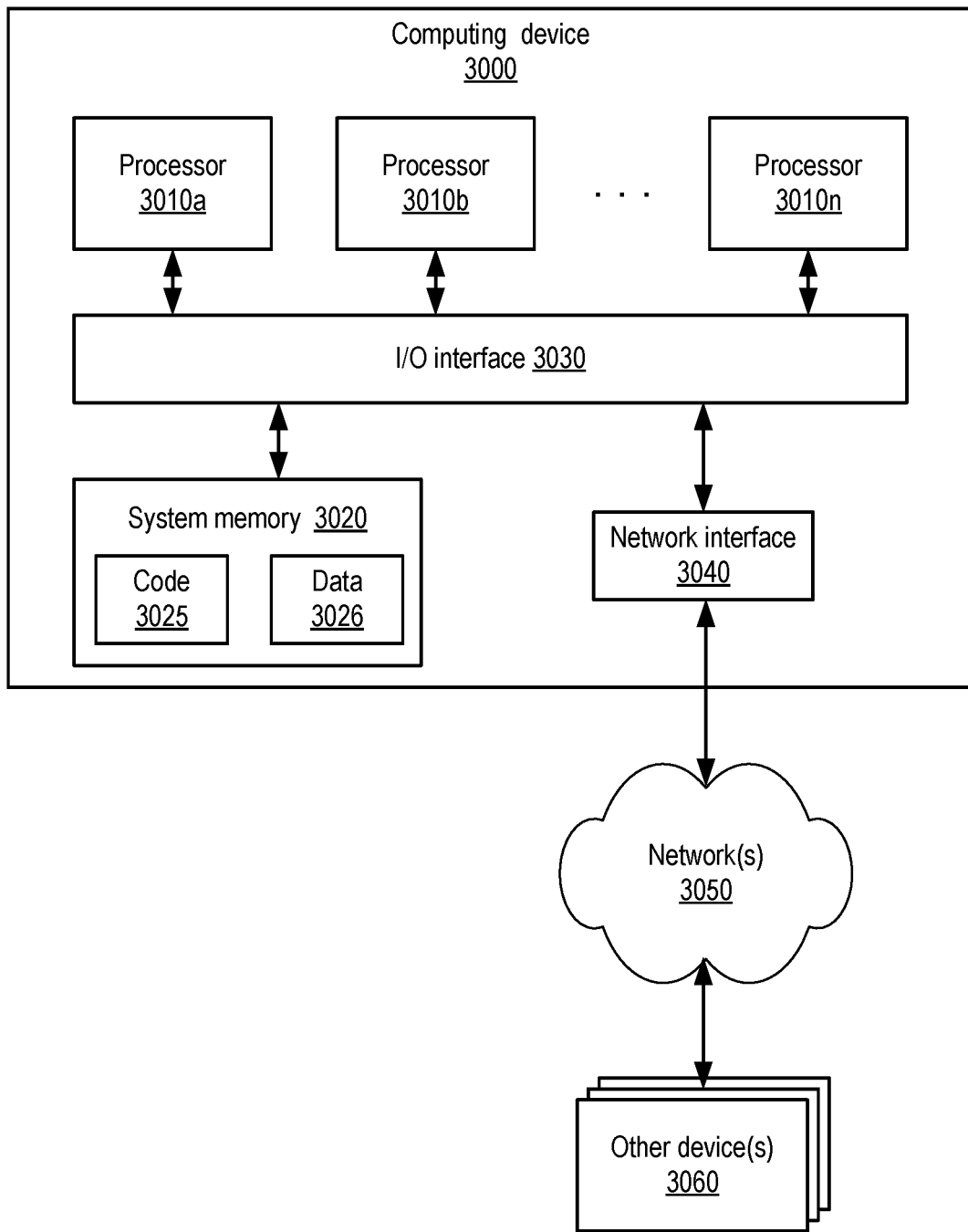
FIG. 11 is a block diagram illustrating an example computing device that may be used in at least some embodiments.

In at least some embodiments, a server that implements a portion or all of one or more of the technologies described herein, including the techniques to implement the functionality of the placement managers, the various control server components and/or the instance hosts, may include a general-purpose computer system that includes or is configured to access one or more computer-accessible media. FIG. 11 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In at least some embodiments, the system memory 3020 may comprise both volatile and non-volatile portions; in other embodiments, only volatile memory may be used. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 10, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, at one or more computing devices:
determining, based at least in part on programmatic input from a client of a network-accessible service, that a service instance of the network-accessible service is to be established at a first facility, wherein the programmatic input indicates the first facility, wherein the first facility includes one or more instance hosts of the network-accessible service and does not include control servers of the network-accessible service, and wherein the one or more instance hosts at the first facility support service instance configuration from one or more remote control servers;
identifying a remote control server at a second facility, located at a separate geographical location from the first facility, to initiate one or more configuration operations associated with the service instance at the first facility; and
causing the remote control server at the second facility to issue one or more commands to an instance host at the first facility to remotely configure the service instance from the remote control server at the separate geographical location.

2. The method as recited in claim 1, wherein the control server is identified based at least in part on a proximity of the control server to a facility of the client.

3. The method as recited in claim 1, wherein the control server is identified based at least in part on a workload level of the control server.

4. The method as recited in claim 1, wherein the second facility does not include instance hosts of the network-accessible service.

5. The method as recited in claim 1, further comprising performing, at the one or more computing devices:
obtaining a request, via a programmatic interface, to configure the service instance, wherein the control server is identified prior to obtaining the request.

6. The method as recited in claim 1, further comprising performing, at the one or more computing devices:
indicating, to the client via a programmatic interface, a constraint applicable to service instances configured at the first facility, wherein the constraint comprises one or more of: (a) a limit on a number of service instances that can be configured, (b) a limited set of supported applications, or (c) a limited set of supported operating systems.

7. The method as recited in claim 1, further comprising performing, at the one or more computing devices:
receiving an indication, from the client, of a desired service characteristic for one or more types of operations;
identifying one or more facilities, including the first facility, based at least in part on the desired service characteristic; and
providing, to the client, an indication of the one or more facilities.

8. A system, comprising:
one or more computing devices;
wherein the one or more computing devices include instructions that upon execution on or across one or more processors cause the one or more computing devices to:
determine, based at least in part on programmatic input from a client of a network-accessible service, that a service instance of the network-accessible service is to be established at a first facility, wherein the programmatic input indicates the first facility, wherein the first facility includes one or more instance hosts of the network-accessible service and does not include control servers of the network-accessible service, and wherein the one or more instance hosts at the first facility support instance configuration from one or more remote control servers;
identify a remote control server at a second facility, located at a separate geographical location from the first facility, to initiate one or more configuration operations associated with the service instance at the first facility; and
cause the remote control server at the second facility to issue one or more commands to an instance host at the first facility to remotely configure the service instance from the remote control server at the separate geographical location.

9. The system as recited in claim 8, wherein the control server is identified based at least in part on a proximity of the control server to a facility of the client.

10. The system as recited in claim 8, wherein the control server is identified based at least in part on a workload level of the control server.

11. The system as recited in claim 8, wherein the second facility does not include instance hosts of the network-accessible service.

12. The system as recited in claim 8, wherein the one or more computing devices include further instructions that upon execution on or across the one or more processors further cause the one or more computing devices to:
obtain a request, via a programmatic interface, to configure the service instance, wherein the control server is identified prior to obtaining the request.

13. The system as recited in claim 8, wherein the one or more computing devices include further instructions that upon execution on or across the one or more processors further cause the one or more computing devices to:
indicate, to the client via a programmatic interface, a constraint applicable to service instances configured at the first facility, wherein the constraint comprises one or more of: (a) a limit on a number of service instances that can be configured, (b) a limited set of supported applications, or (c) a limited set of supported operating systems.

14. The system as recited in claim 8, wherein the first facility comprises at least a portion of one or more of: (a) a container-based computing facility, (b) a mobile data center that can be transported to a desired location, (c) a telecommunication provider equipment facility, (d) a client-owned computing facility, (e) a leased computing facility, or (f) a third-party computing facility.

15. One or more non-transitory computer-accessible storage media storing program instructions that when executed on or across one or more processors cause one or more computer systems to:
determine, based at least in part on programmatic input from a client of a network-accessible service, that a service instance of the network-accessible service is to be established at a first facility, wherein the programmatic input indicates the first facility, wherein the first facility includes one or more instance hosts of the network-accessible service and does not include control servers of the network-accessible service, and wherein the one or more instance hosts at the first facility support instance configuration from one or more remote control servers;
identify a remote control server at a second facility, located at a separate geographical location from the first facility, to initiate one or more configuration operations associated with the service instance at the first facility; and
cause the remote control server at the second facility to issue one or more commands to an instance host at the first facility to remotely configure the service instance from the remote control server at the separate geographical location.

16. The one or more non-transitory computer-accessible storage media as recited in claim 15, wherein the control server is identified based at least in part on a proximity of the control server to a facility of the client.

17. The one or more non-transitory computer-accessible storage media as recited in claim 15, wherein the control server is identified based at least in part on a workload level of the control server.

18. The one or more non-transitory computer-accessible storage media as recited in claim 15, wherein the second facility includes one or more instance hosts of the network-accessible service.

19. The one or more non-transitory computer-accessible storage media as recited in claim 15, storing further program instructions that when executed on or across one or more processors further cause the one or more computer systems to:
obtain a request, via a programmatic interface, to configure the service instance, wherein the control server is identified in prior to obtaining the request.

20. The one or more non-transitory computer-accessible storage media as recited in claim 15, storing further program instructions that when executed on or across one or more processors further cause the one or more computer systems to:
indicate, to the client via a programmatic interface, a constraint applicable to service instances configured at the first facility, wherein the constraint comprises one or more of: (a) a limit on a number of service instances that can be configured, (b) a limited set of supported applications, or (c) a limited set of supported operating systems.

* * * * *